United States Patent
Zhou et al.

(10) Patent No.: US 10,997,277 B1
(45) Date of Patent: May 4, 2021

(54) MULTINOMIAL DISTRIBUTION ON AN INTEGRATED CIRCUIT

(71) Applicant: Amazon Technologies, Inc., Seattle, WA (US)

(72) Inventors: Yu Zhou, Pflugerville, TX (US); Vignesh Vivekraja, Santa Clara, CA (US); Ron Diamant, Albany, CA (US)

(73) Assignee: Amazon Technologies, Inc., Seattle, WA (US)

( * ) Notice: Subject to any disclaimer, the term of this patent is extended or adjusted under 35 U.S.C. 154(b) by 212 days.

(21) Appl. No.: 16/364,837

(22) Filed: Mar. 26, 2019

(51) Int. Cl.
*G06F 17/18* (2006.01)
*G06N 3/04* (2006.01)

(52) U.S. Cl.
CPC .............. *G06F 17/18* (2013.01); *G06N 3/04* (2013.01)

(58) Field of Classification Search
CPC ........ G06F 17/18; G06F 3/0655; G06F 40/30; G06N 20/00; G06N 7/005; G06N 3/04
See application file for complete search history.

(56) References Cited

U.S. PATENT DOCUMENTS

| | | | | |
|---|---|---|---|---|
| 5,129,002 A * | 7/1992 | Tsuboka | ................. | G10L 15/144 704/236 |
| 5,841,655 A * | 11/1998 | Stocking | ................. | G06Q 10/10 700/83 |
| 6,388,592 B1 * | 5/2002 | Natarajan | ............... | H03M 7/30 341/107 |
| 8,589,404 B1 * | 11/2013 | Dunkelberger | ..... | G06F 16/9535 707/743 |
| 9,009,095 B1 * | 4/2015 | Fafri | ....................... | G06F 17/18 706/52 |
| 10,678,479 B1 * | 6/2020 | Diamant | ................ | G06F 3/0679 |
| 2003/0182293 A1 * | 9/2003 | Chambers | ............... | G06F 17/18 |

(Continued)

OTHER PUBLICATIONS

"Python torch.cumsum() Examples". Retrieved on [Dec. 7, 2020]. Retrieved from the Internet www.programcreek.com/python/example/101233/torch.cumsum (Year: 2020).*

(Continued)

*Primary Examiner* — Andrew Caldwell
*Assistant Examiner* — Carlo Waje
(74) *Attorney, Agent, or Firm* — Kilpatrick Townsend & Stockton LLP

(57) ABSTRACT

An integrated circuit device such as a neural network accelerator can be programmed to select a numerical value based on a multinomial distribution. In various examples, the integrated circuit device can include an execution engine that includes multiple separate execution units. The multiple execution units can operate in parallel on different streams of data. For example, to make a selection based on a multinomial distribution, the execution units can be configured to perform cumulative sums on sets of numerical values, where the numerical values represent probabilities. In this example, to then obtain cumulative sums across the sets of numerical values, the largest values from the sets can be accumulated, and then added, in parallel to the sets. The resulting cumulative sum across all the numerical values can then be used to randomly select a specific index, which can provide a particular numerical value as the selected value.

20 Claims, 17 Drawing Sheets

(56) References Cited

U.S. PATENT DOCUMENTS

| | | | |
|---|---|---|---|
| 2005/0096866 A1* | 5/2005 | Shan | G06F 11/0751 |
| | | | 702/179 |
| 2014/0365747 A1* | 12/2014 | Ould-Ahmed-Vall | ........................ |
| | | | G06F 9/30036 |
| | | | 712/4 |
| 2018/0004514 A1* | 1/2018 | Brown | G06F 9/30036 |
| 2018/0200624 A1* | 7/2018 | Palikuqi | A63F 13/69 |
| 2019/0172479 A1* | 6/2019 | Xiao | G10L 25/03 |
| 2019/0311071 A1* | 10/2019 | Liu | G06F 7/58 |
| 2019/0377984 A1* | 12/2019 | Ghanta | G06K 9/6259 |
| 2020/0026760 A1* | 1/2020 | Chiu | G06F 40/40 |
| 2020/0326910 A1* | 10/2020 | Parikh | G06F 5/01 |
| 2020/0372435 A1* | 11/2020 | Kenthapadi | G06N 20/00 |

OTHER PUBLICATIONS

Wikipedia, "Multinomial Distribution", https://en.wikipedia.org/wiki/Multinomial_distribution, last edited on Nov. 14, 2018, 6 pages.

* cited by examiner

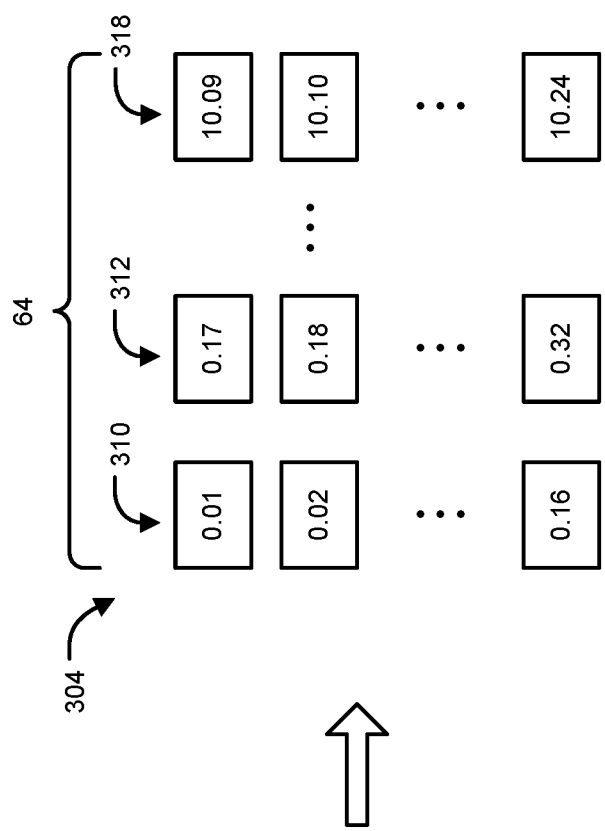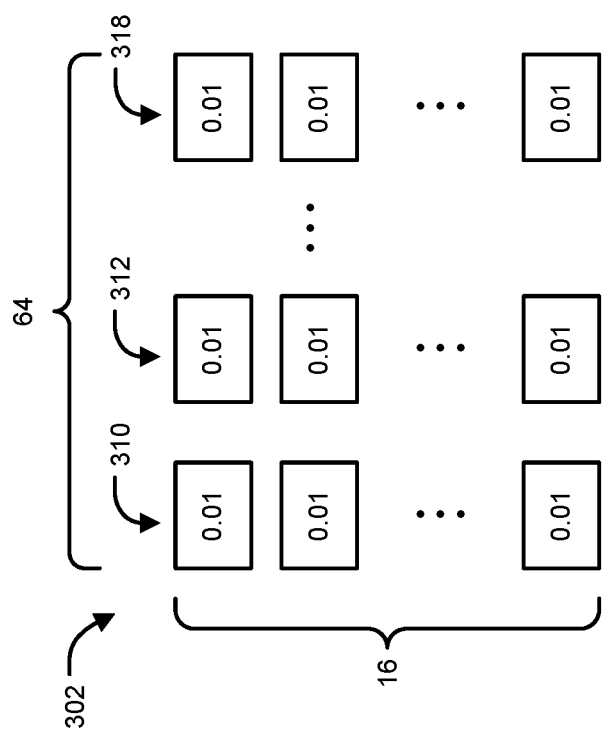
FIG. 3A

700

Computing first cumulative sums on numerical values stored in memory banks of the integrated circuit device, wherein sets of the numerical values are each stored in different memory banks, each memory bank having a bank identifier, and wherein each first cumulative sum is computed in parallel on a respective set of the numerical values in a respective memory bank
702

↓

Computing second cumulative sums on a set of the first cumulative sums, the set of the first cumulative sums including a first cumulative sum from each of the memory banks
704

↓

Adding to each first cumulative sum a second cumulative sum from the second cumulative sums, wherein the second cumulative sum that is added to each respective set of the first cumulative sums in a memory bank is from a memory bank with a bank identifier that is one less than a bank identifier for the memory bank storing the respective set of the first cumulative sums, and wherein the adding occurs in parallel on the respective set of the first cumulative sums in the respective memory bank
706

↓

Comparing a random value generated by the integrated circuit device against each of the first cumulative sums, wherein the comparing includes determining whether the random value is greater than or equal to each of the first cumulative sums
708

↓

Storing results of the comparing in the memory banks, wherein sets of the results are each stored in different memory banks
710

↓

Computing a first set of sums on the sets of the results, wherein the first set of sums includes a sum for each of the sets of the results, and wherein each of the first set of sums is computed in parallel on a respective set of the results in a respective memory bank
712

↓

Computing a second sum on the first set of sums, wherein the second sum is an index of a particular numerical value of the numerical values
714

↓

Outputting the index
716

FIG. 7

MULTINOMIAL DISTRIBUTION ON AN INTEGRATED CIRCUIT

BACKGROUND

A multinomial distribution is the probability distribution of the outcomes from a multinomial experiment. A multinomial experiment is a statistical experiment in which there are a number of independent trials and each trial has a discrete number of possible outcomes. On any given trial, the probability that a particular outcome will occur is constant. An example of such an experiment is the tossing of two dice three times: the number of trials is three, each trial can result in a discrete number of outcomes (a sum between two and twelve, inclusive), and the probability of any outcome is constant, in that the outcome does not change from one toss to the next.

Multinomial distributions occur in computing systems when a computation performed by a computing device outputs a set of probabilities. In these situations, the computing device may be configured to randomly select one of the probabilities, where the value of each probability determines how frequently the probability will be picked. An example of a computation that outputs a set of probabilities is the softmax function. The softmax function takes as input a vector of K real numbers and normalizes the vector into a probability distribution including K probabilities. Softmax is often used in neural networks, for example to map the non-normalized output of a neural network to a probability distribution over predicted output classes.

A multinomial distribution selection process may be used in a computation to make the computation more resilient to errors. For example, a neural network can generate a set of probabilities when determining a next choice to make. In this example, when the neural network always chooses the highest-ranked choice, and this choice is wrong, then the neural network is consistently wrong. If the neural network instead makes a random choice, with the randomness being biased according to the rankings provided by the probabilities, then neural network may be able to self-correct as the computation progresses.

BRIEF DESCRIPTION OF THE DRAWINGS

Various examples will be described with reference to the drawings, in which:

FIGS. 3A-3E illustrate an example of steps that can be performed to select a numerical value based on a multinomial distribution;

FIG. 7 includes a flowchart illustrating an example of a process for selecting a value based on a multinomial distribution;

DETAILED DESCRIPTION

Figure 1:
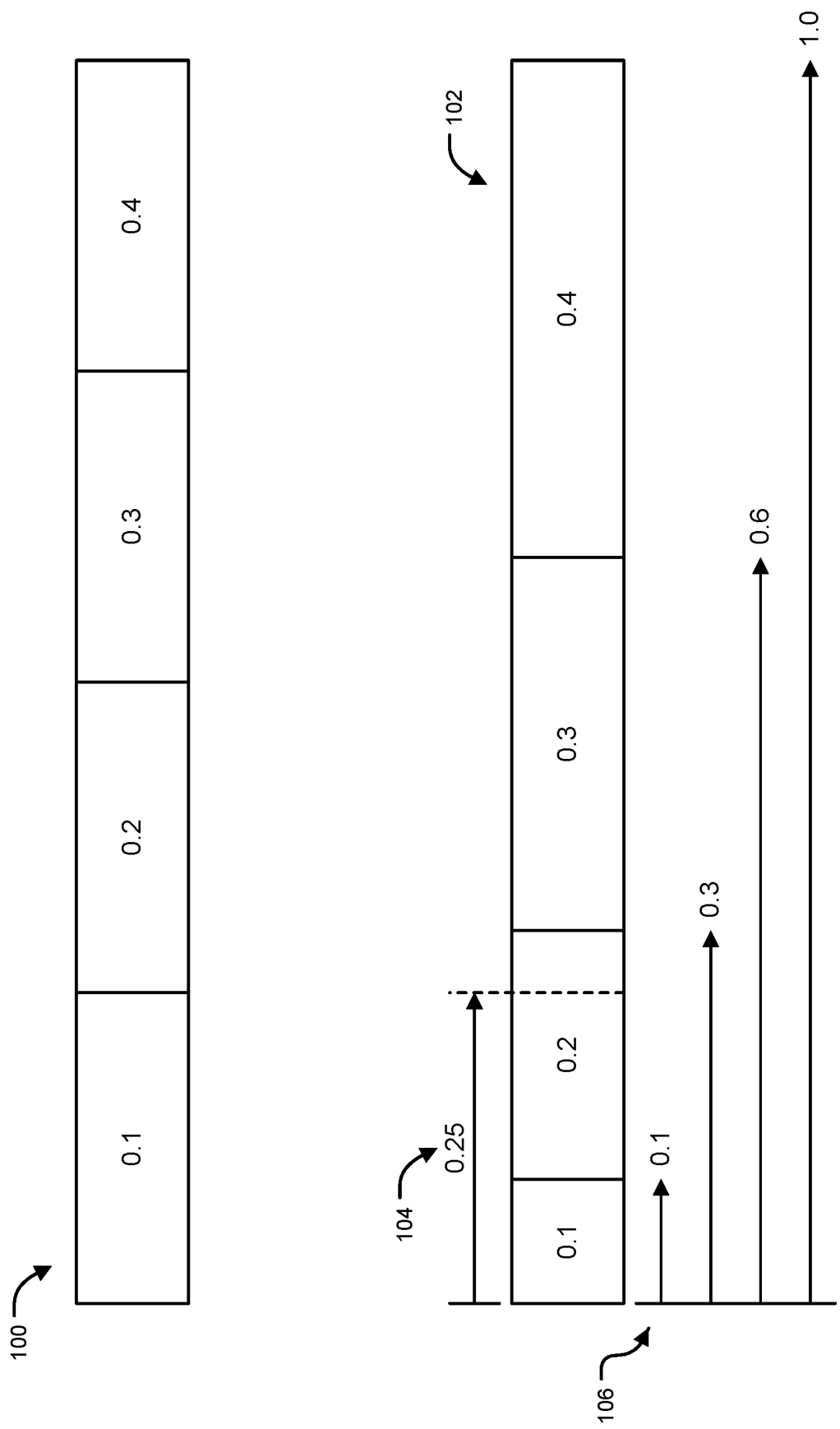
FIG. 1 illustrates an example of performing a selection based on a multinomial distribution.

A neural network processor is a type of integrated circuit device that is purpose built to execute neural networks. Executing a neural network (referred to as performing an inference) can require large numbers of simple operations such as add and multiply, which can be performed in parallel and thus can be efficiently executed by hardware that supports large numbers of parallel computations. While a general purpose processor can execute a neural network, general purpose processors may be designed for greatest flexibility in the types of operations these processors can perform, rather than for large amounts of parallel computations. Graphics Processing Units (GPUs) can also be used to execute a neural network, but may be optimized for parallel computation on unrelated vectors of data, while neural networks tend to require tensor operations, such as multiplication of arrays and accumulation of array values. Additionally, graphics processing units may be expensive, in terms of monetary cost and operating cost, to add to a computing device, while neural network processors may be much more inexpensive. In some examples, neural network processors are also referred to as neural network accelerators.

Making a decision based on a multinomial distribution is an operation that can occur in the execution of a neural network. While the program instructions for performing such a selection can be performed by a general purpose processor, doing so can be disruptive to the execution of the neural network. For example, a neural network processor that is in the middle of performing an inference may have to stop and wait while a general purpose processor in the system performs the selection based on the multinomial distribution. In this example, the neural network processor will be idle until the general purpose processor has provided an answer. The inference can be performed more efficiently if the neural network processor can itself make the selection.

In various examples, an integrated circuit device such as a neural network accelerator can be programmed to select a numerical value based on a multinomial distribution. The multinomial distribution can be a set of probabilities output by a computation, such as a step in the execution of a neural network. Making a selection based on a multinomial distribution can include a sequential series of steps, however, the techniques discussed herein make use of the parallel computation capabilities of the integrated circuit device. By parallelizing the steps, the integrated circuit device can make the selection efficiently and with significant additional computational load on the device. The integrated circuit device can thus make the selection while performing a larger computation that uses the selection, so that the larger computation need not be stalled while steps to make the selection are performed elsewhere.

In various examples, the integrated circuit device can include an execution engine that includes multiple separate execution units. The multiple execution units can operate in parallel on different streams of data, and can perform various mathematical, logical, and/or comparative operations. For example, to make a selection based on a multinomial distribution, the execution units can be configured to perform cumulative sums on sets of numerical values, where the numerical values represent probabilities. In this example, to then obtain cumulative sums across the sets of numerical values, the largest values from the sets can be accumulated, and then added, in parallel to the sets. The resulting cumulative sum across all the numerical values can then be used to randomly select a specific index, which can provide a particular numerical value as the selected value.

Various examples are described herein. For purposes of explanation, specific configurations and details are set forth in order to provide a thorough understanding of the examples. However, it will also be apparent to one skilled in the art that the example may be practiced without the specific details. Furthermore, well-known features may be omitted or simplified in order not to obscure the embodiments being described.

FIG. 1 illustrates an example of performing a selection based on a multinomial distribution. The multinomial distribution is illustrated here as a set of probabilities 100 having the values 0.1, 0.2, 0.3, and 0.4. The probabilities 100 can be generated, for example, by an operation such as the softmax function. In this example, the probabilities 100 are represented as a value between 0 and 1, and the sum of the probabilities 100 is 1. In other examples, the sum of the probabilities 100 can be less than 1 or greater than 1.

Making a selection based on a multinomial distribution means randomly selecting one of the probabilities 100, where the likelihood of a particular probability being selected is determined by the value of the probability. For example, over a number of selections, the value 0.1 should be selected 10% of the time, the value 0.2 should be selected 20% of the time, the value 0.3 should be selected 30% of the time, and the value 0.4 should be selected 40% of the time.

An example technique for randomly selecting one of the probabilities 100 is shown by a selection space 102 illustrated in FIG. 1. The selection space 102 reflects all possible selections between 0 and the sum of the probabilities 100, which here is 1. In the selection space 102, each of the probabilities 100 is allocated an area that reflects the value of each probability. For example, the value 0.1 is allocated one tenth of the selection space, the value 0.2 is allocated two tenths of the selection space, the value 0.3 is allocated three tenths of the selection space, and the value 0.4 is allocated four tenths of the selection space. Though the probabilities 100 are shown in the selection space 102 sorted by smallest to largest, the probabilities 100 need not be arranged in any particular order, so long as the space assigned to each of the probabilities 100 reflects the numerical value of each probability.

To select one of the probabilities 100 using the selection space 102, a random number 104 can be generated that falls somewhere within the selection space 102. The random number 104 can be generated, for example, using random number generator that generates evenly distributed random numbers. To determine where in the selection space 102 the random number 104 falls, the selection process can compute a series of cumulative sums 106 of the probabilities 100, and can compare the cumulative sums 106 against the random number 104. For example, at the first index, the process can add the probability 0.1 to 0 to determine a cumulative sum of 0.1. The process can next determine whether the random number 104 is less than or equal to the cumulative sum of 0.1. Because the random number 104 is not less than or equal to the cumulative sum of 0.1, the process determines that the probability at the first index (0.1), is not the probability that has been selected. The process next adds the probability at the second index (0.2) to the cumulative sum, to obtain 0.3. The random number 104 is less than or equal to the new cumulative sum of 0.3. Thus, the process selects the probability at the second index (0.2). In this example, the process need not continue computing the remaining cumulative sums (0.6 and 1.0 for the third and fourth indexes, respectively).

Figure 2:
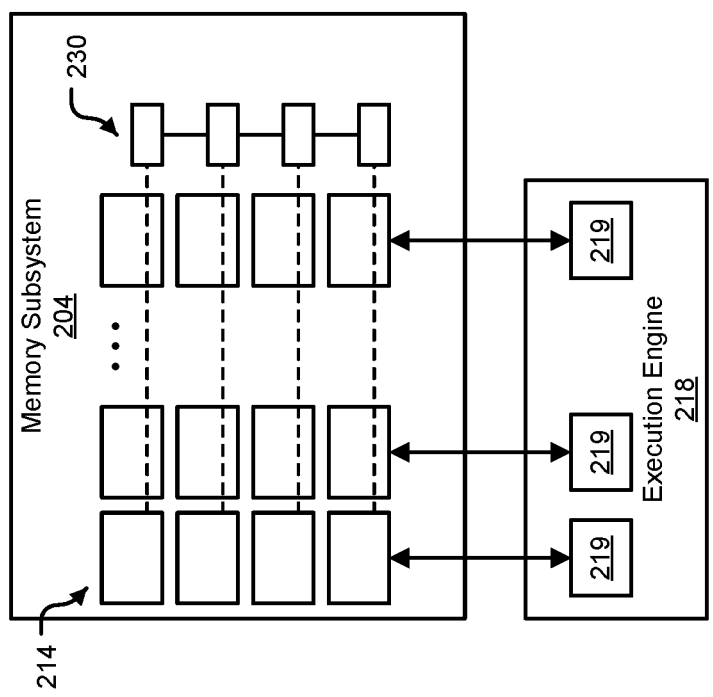
FIG. 2 illustrates integrated circuit components that can be used to select a value based on a multinomial distribution.

FIG. 2 illustrates integrated circuit components that can be used to select a value based on a multinomial distribution. The illustrated components include a memory subsystem 204 and an execution engine 218. The components can be part of a larger integrated circuit, such as a neural network accelerator. Additionally, in some examples, components that are not illustrated here can interact with the illustrated components. For example, other execution engines may be able to read data from or write data to the memory subsystem 204.

In various examples, the memory subsystem 204 provides storage space for data that is being operated on by the integrated circuit device, including being operated on by the execution engine 218. The memory subsystem 204 can be organized into multiple independent memory banks 214. The memory banks 214 can also be referred to as memory partitions. Independent, in this context, means that the memory banks 214 do not share an address space, and are each read and written independently. For example, to read a value from one memory bank, a read request is placed on the input ports to the one memory bank. In this example, the one memory bank cannot be read by, for example, placing a read request on the input ports of another memory bank, with the expectation that the read request will be passed on to the correct memory bank. This arrangement of independent memory banks 214 may be chosen for simplicity and efficiency. For example, by not requiring that any memory bank be readable, wiring across the memory subsystem 204 is eliminated and no arbitration logic for selecting among the memory banks 214 is needed. As another example, each memory bank can be assigned to a different client (e.g., a circuit component that uses the memory subsystem 204), which then can use the assigned memory bank without contention with other clients.

In the example of FIG. 2, execution units 219 of the execution engine 218 are assigned to different memory banks 214 of the memory subsystem 204. The execution engine 218 of this example is an integrated circuit component that can be configured to perform various mathematical, logical, and/or comparative operations. The execution engine 218 uses the execution units 219 to perform these operations. The execution units 219 are each instances of a similar block of logic that can perform the operations. In various examples, the execution engine 218 has more than one execution unit so that the execution engine 218 can operated on different data simultaneously and in parallel. For example, the execution engine 218 can configure one or more of the execution units 219 to read two operands from the memory banks 214 assigned to each of the execution units 219, execute an operation using the two operands, and to write a result back to a respective memory bank. In this example, the operation executed by the different execution units 219 can be the same or can be different.

Due to the independent arrangement of the memory banks 214, the individual execution units 219 are not able to read or write data to a memory bank other than the memory bank assigned to each execution unit. To enable data operated one by one of the execution units 219 to be accessible to another execution unit, the memory subsystem 204 can include a set of registers 230 that have access to each of the memory banks 214. The registers 230 can be used for temporary storage of data. In some examples, the registers 230 each store one data word (e.g., a 32-bit value, a 64-bit value, a 128-bit value, or a value of another size that is defined in the system as a "data word") at a time. In various examples, the registers 230 can be used to read a value from any of the memory banks 214 (as shown by dotted lines in FIG. 2), which is then stored in the registers 230. The data in the registers 230 can further be written to any of the registers 230. As another example, a series of values can be read from one memory bank and into the registers 230. The values in the registers 230 can also be serially read into one of the memory banks. Parallel reads from multiple memory banks into the registers 230 can be followed by serially writing the values into one memory bank, and serial reads from one memory bank into the registers 230 can be followed by a parallel write from the registers 230 into multiple memory banks 214.

In the example of FIG. 2, the registers 230 are illustrated as being part of the memory subsystem 204. In some examples, the registers 230 can be located elsewhere, such as in the execution engine 218.

FIGS. 3A-3E illustrate an example of steps that can be performed to select a numerical value based on a multinomial distribution. The illustrated steps can be performed, for example, by the integrated circuit components illustrated in FIG. 2. The steps are illustrated in FIGS. 3A-3E by showing numerical values, the operations performed on the numerical values, and the results of the operations. The numerical values and the results of the operations are shown as arranged in columns (a first column 310, a second column, 312, and a last column 318; for the sake of clarity, the columns between the second and the last column 318 are not shown), where each column represents a set of numerical values that is stored in a different memory bank or memory partition. As in the example of FIG. 2, each of the memory partitions of FIG. 3 can be read or written by a different execution unit that is capable of performing mathematical, logical, and/or comparative operations. Additionally, one execution unit is not able to read or write to another's memory partition. Data from the memory partitions can be, however, be read into a set of registers, which may each be able to store one data word at a time. The data can also be written from the registers into the memory partitions.

Figure 3B:
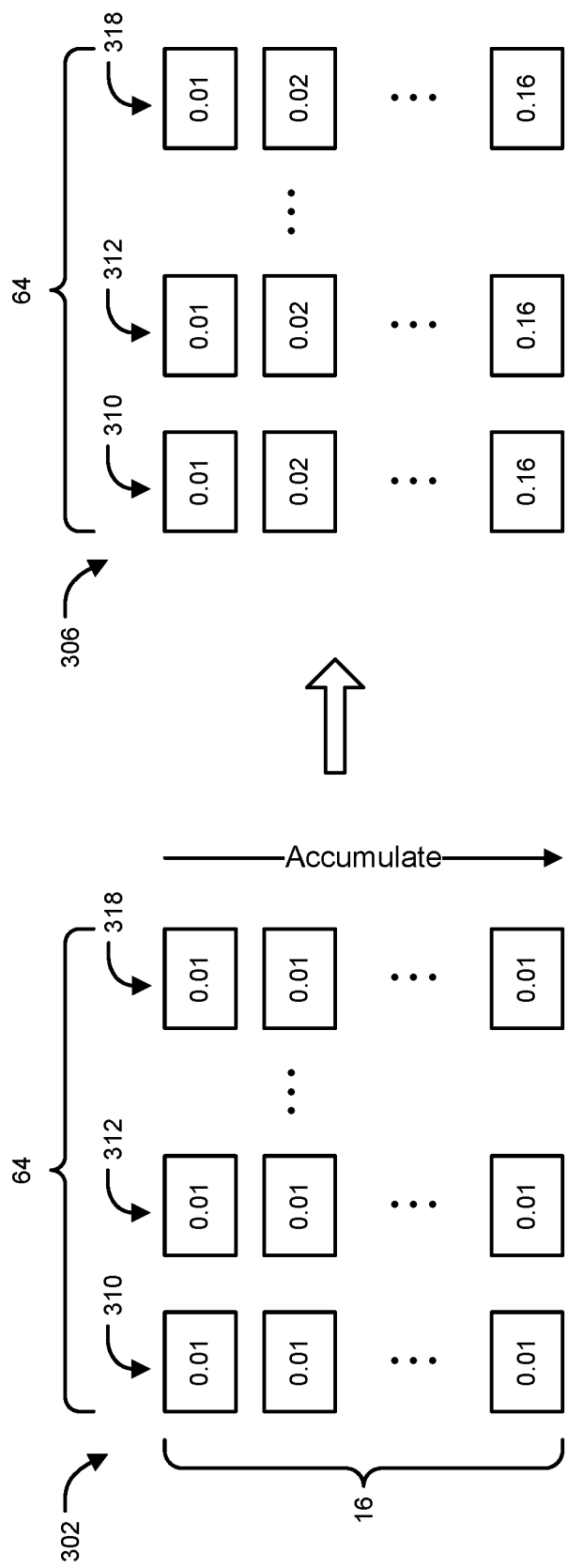

FIG. 3A illustrate a set of numerical values 302 that represent the probabilities among which one value is to be chosen. The numerical values 302 are stored in 64 memory partitions, with each memory partitions storing a set of 16 values. FIG. 3A also illustrates the objective of the series of steps illustrated in FIGS. 3A-3F, which is cumulative sums 304 of the numerical values 302. For the sake of the clarity in the following discussion, the numerical values 302 are all shown as being the same. In most cases, the numerical values 302 among which one value is to be chosen are going to vary. Additionally, the sum of the numerical values 302 of this example is greater than 1. In other examples, the sum of the numerical values 302 can be equal to 1.

In some examples, the numerical values 302 may have been generated in parallel, and thus are stored across different memory partitions as the numerical values 302 are output by an execution engine. In some examples, the numerical values 302 are evenly distributed across the memory partitions, such that, as best as possible, each partition has a same quantity of the numerical values 302. In some examples, this may not be the case, for example because the numerical values 302 are not generated in sets of equal sizes, because the numerical values 302 are not evenly divisible by the number of available memory partitions, or for another reason. In various examples, the number of memory partitions used is equal to the number of execution units in the execution engine that is to perform the operations discussed below. For example, the execution engine may have 64 execution units. In some cases, not all the execution engines are available, or space in the memory partitions is not available, in which case fewer than all the execution engines (and corresponding memory partitions) can be used.

FIG. 3B illustrates a first step in generating the target cumulative sums 304, and a first set of intermediate values 306 that is generated at this step. The intermediate values 306 in FIG. 3B are cumulative sums on the set of numerical values in each memory partition. A cumulative sum is separately performed on each column, and can be performed in parallel by different execution units. As an example, in the first column 310, the first value is added to zero, and the result (0.01) is stored in place of the first value. The second value is added to the previous sum (0.01+0.01) and stored in place of the second value. A third value would be added to this sum (0.01+0.02) and be stored in place of the third value, and so on to the sixteenth value in the set. The same steps are also performed in each of the second column 312 to the last column 318. The execution engine can include an instruction called TensorCumulativeOp that can take as an argument a mathematical operation to perform in a cumulative fashion (e.g., addition, in the example of FIG. 3B; other operations can include subtraction, multiplication, division, logical operators, and comparative operators).

In various examples, the cumulative sums can occur in parallel across the memory partitions. For example, 64 additions can occur at the same time (e.g., in the same clock cycle or set of clock cycles) with one addition being performed for each column. In this example, 16 iterations (e.g., 16 clock cycles or sets of clock cycles) occur in computing the intermediate values 306.

In the example of FIG. 3B, the intermediate values 306 replace the original numerical values 302 in the memory partitions (e.g., the numerical are overwritten with the intermediate values 306). In other examples, the intermediate values 306 can be written to different locations in the memory partitions, or can be written to a separate set of memory partitions.

Figure 3C:
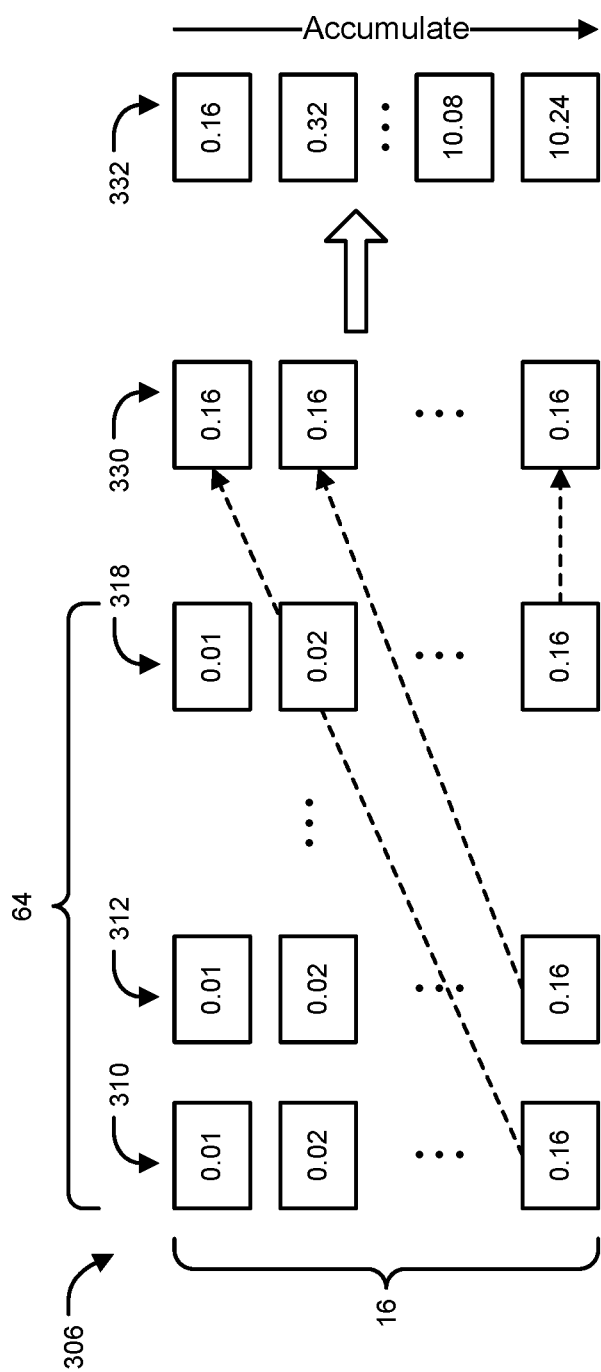

FIG. 3C illustrates a second and third step in generating the cumulative sums 304. In the second step, one cumulative sum 330 from each of the columns are copied to a separate memory partition. The cumulative sum 330 that is copied from each memory partition can be the one in the last index in each column (e.g., index 16 in the example of FIG. 3C, with the indices starting at 0). The cumulative sum 330 in the last index is the sum of all the values in the column, and thus may be the largest sum in the column. To perform the copying, in some examples, the cumulative sums 330 from each of the columns can be copied to the set of memory registers. For example, an instructions for loading the registers in parallel with a value from each of the memory partitions can be used. The cumulative sums 330 can then be serially read from the registers, and written to the separate memory partition.

Once the cumulative sums 330 are copied to the separate memory partition, the third step is to perform another cumulative sum on these cumulative sums 330 to generate a second set of intermediate values 332 that includes the results. Similar to the first step, generating the second intermediate values 332 includes adding the first of the cumulative sums 330 to 0; adding the result of this sum to the second of the cumulative sums 330; adding the result of this sum to the third of the cumulative sums 330; and so on until the last of the cumulative sums 330.

Figure 3D:
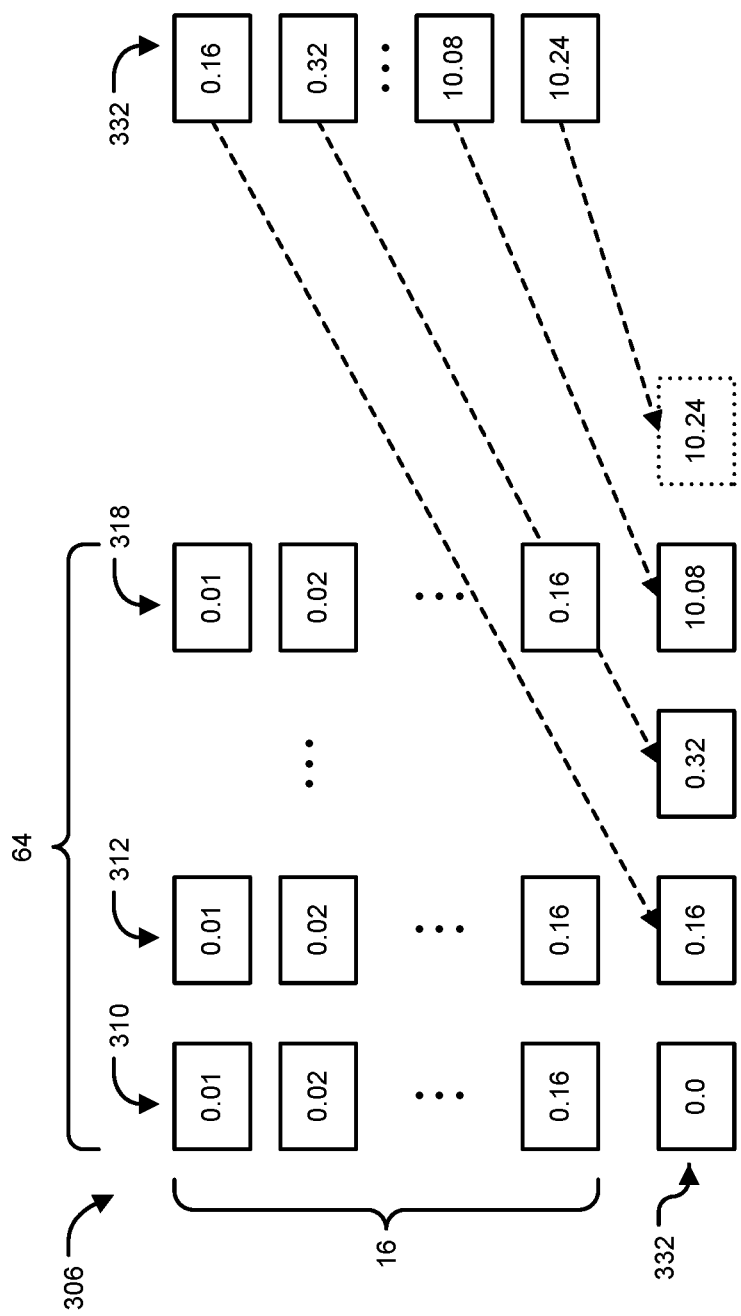

FIG. 3D illustrates the fourth step in generating the cumulative sums 304. In this step, the intermediate values 332 (e.g., the cumulative sums of the cumulative sums 330 from each column) are each copied to one of the memory partitions. Each of the intermediate values 332 is written to a partition that has an index that is one greater than the partition from which the value was originally obtained. For example, the first of the cumulative sums 330 that was used to compute the first of the intermediate values 332 was copied from the first column 310, and thus this first intermediate value is written to the second column 312. The last of the intermediate values 332 is not needed, and thus is discarded. Additionally, a value of 0 is written to the first column 310, so that the next step can include identical operations on each of the columns.

To copy the intermediate values 332 to the memory partitions, the intermediate values 332 can first be copied to the set of registers, for example by serially reading each of the intermediate values 332 from the separate memory partition and into a different register of the set. Once the intermediate values 332 are loaded into the registers, the intermediate values 332 can then be written, in parallel, to the memory partitions. In various examples, this parallel writing can also include shifting the intermediate values 332 to the desired memory partitions.

Figure 3E:
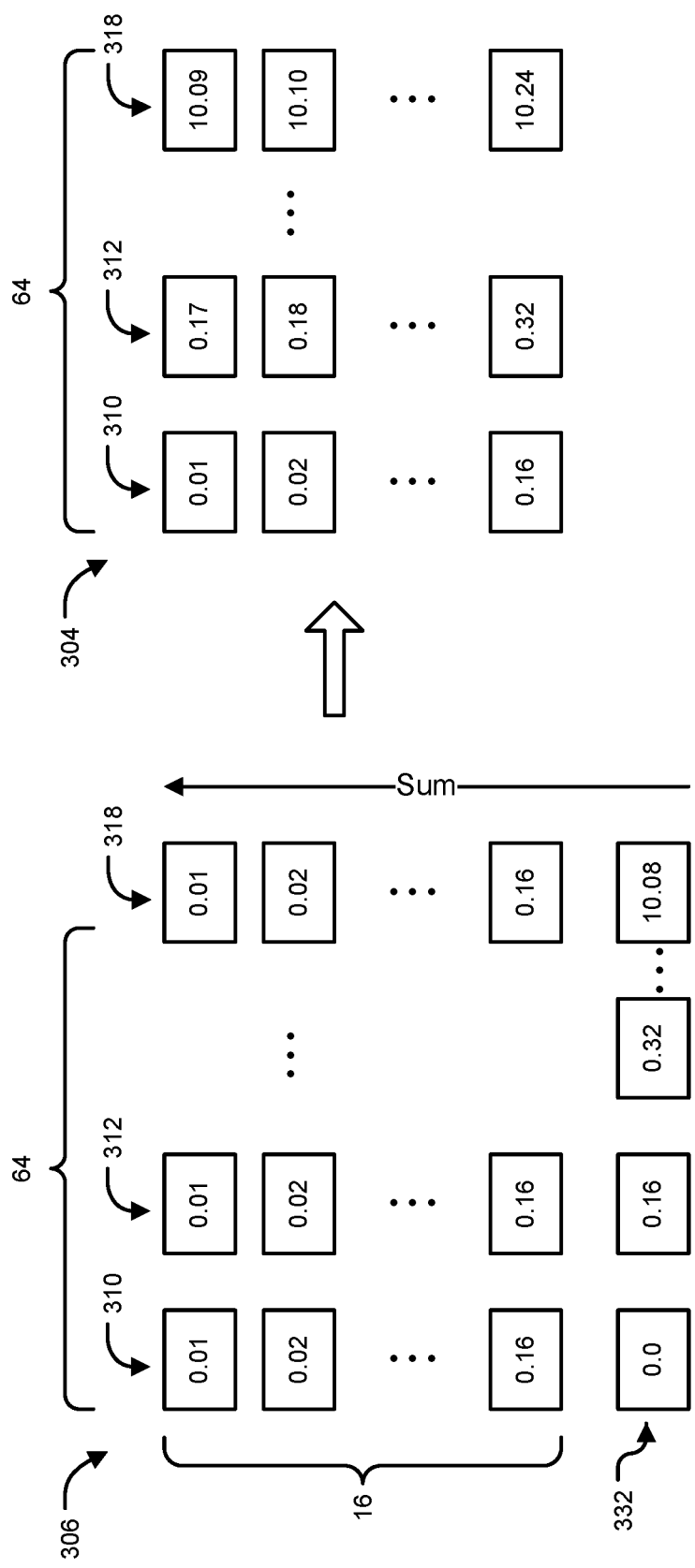

FIG. 3E illustrates a fifth step in generating the cumulative sums 304. In this step, the intermediate values 332 generated in FIG. 3D are added to each of the intermediate values 306 in the memory partitions. In this step, a cumulative sum is not performed; instead, individual sums are performed. For example, in the first column 310, the value 0.0 is added to each of the set of numerical values in the first column 310; in the second column 312, the value 0.16 is added to each of the numerical values in the second column 312; and so on until the last column 318, where the value 10.08 is added to each of the numerical values in the last column 318.

In various examples, the additions of this step can occur in parallel. For example, 64 additions can occur at the same time (e.g., in the same clock cycle or set of clock cycles), with one addition being performed per column. In this example, 16 iterations (e.g., 16 clock cycles or sets of clock cycles) occur, at the end of which the memory partitions are storing the cumulative sums 304 of the original numerical values 302.

In the example of FIG. 3E, the final cumulative sums 304 replace the intermediate values 306 in the memory partitions (e.g., the intermediate values 306 are overwritten by the cumulative sums 304). In other examples, the cumulative sums 304 can be stored in different locations in the memory partitions, so that the intermediate values 306 are not overwritten. In some examples, the cumulative sums 304 can be written to entirely different memory partitions.

Figure 4A:
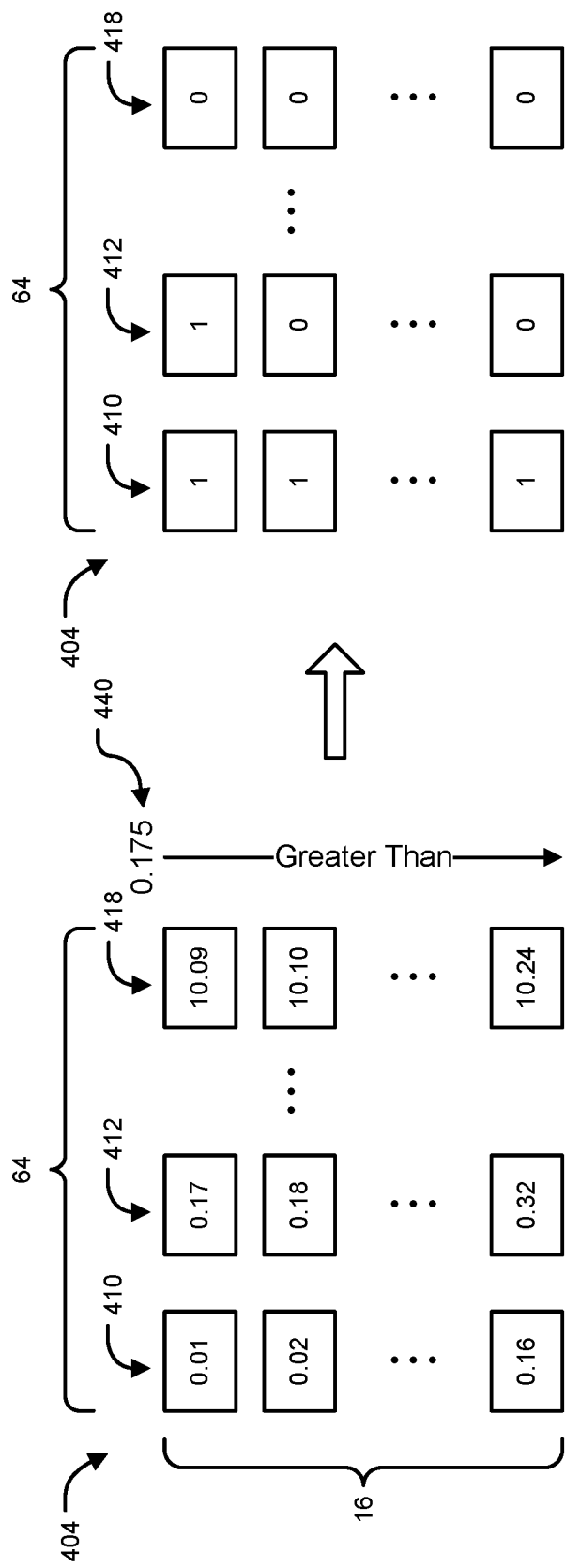
FIGS. 4A-4C illustrate an example of steps that can be performed to select a numerical value based on a multinomial distribution.
Figure 4B:
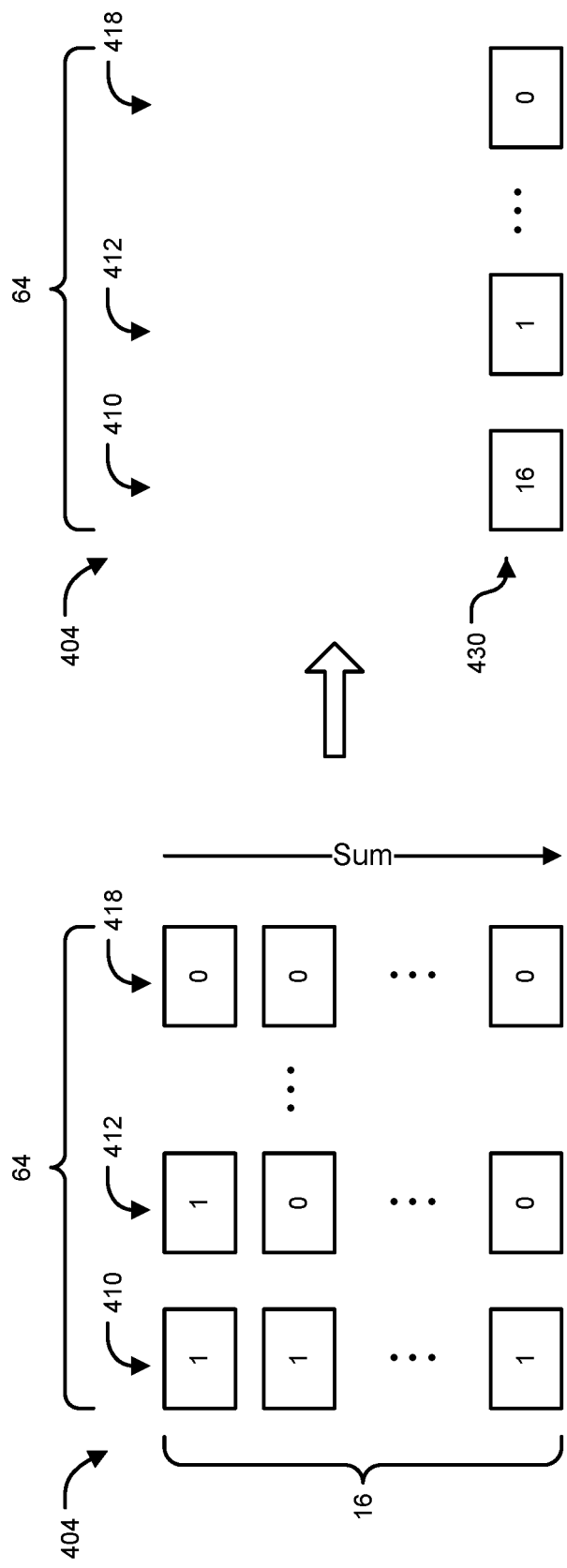
Figure 4C:
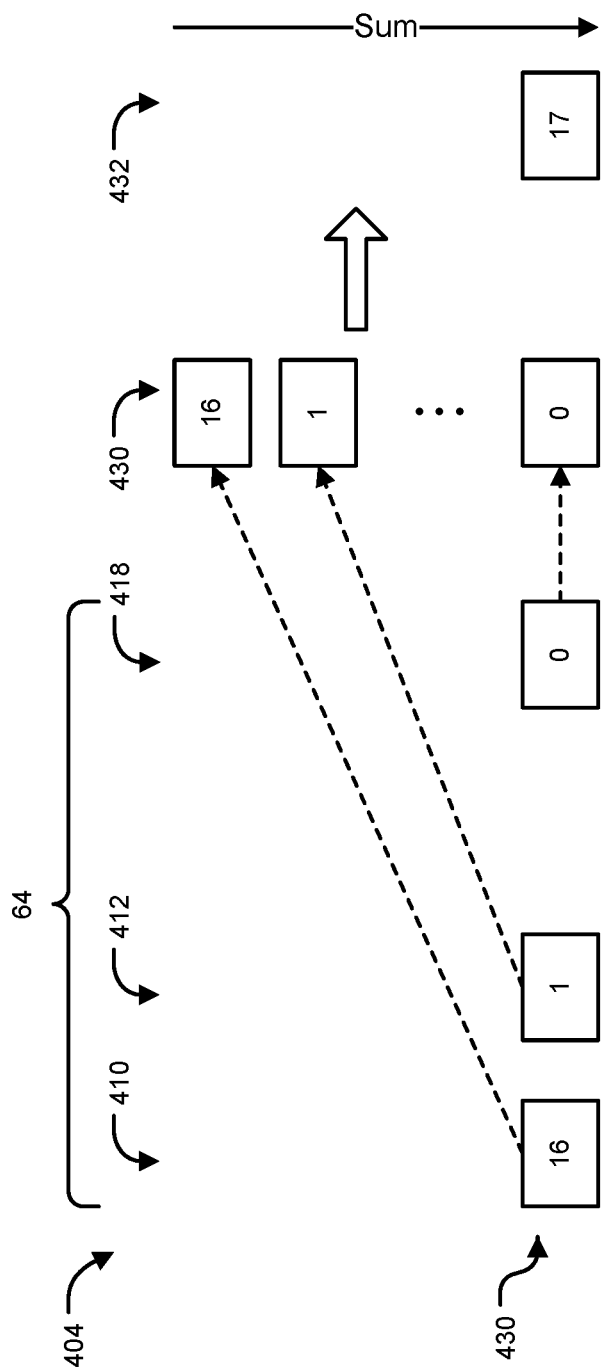

FIGS. 4A-4C illustrate an example of steps that can be performed to select a numerical value based on a multinomial distribution. The illustrated steps can be performed, for example, by the integrated circuit components illustrated in FIG. 2. The steps illustrated in FIGS. 4A-4C start with a set of cumulative sums 404 computed from a set of numerical values, as illustrated in FIGS. 3A-3E. As in that example, the cumulative sums 404 of FIGS. 4A-4C are arranged in columns (a first column 410, a second column 412, and a last column 418, with a number of additional columns between the second column 412 and the last column 418 that are not illustrated), where each column represents a set of numerical values that is stored in a different memory bank or partition. Each memory bank or partition is independently accessible by an execution unit of an execution engine, and the execution units can perform various operations on the data stored in each partition. The execution engine or another component can include a set of registers for moving data between the memory partitions.

FIG. 4A illustrates a first step in selecting a particular value. The particular value is selected using a random number 440 (0.175, in the illustrated example). The random number 440 can be generated, for example, by random number generation circuit that can generate uniformly distributed random numbers. In the step illustrated in FIG. 4A, the random number 440 is compared against each of the cumulative sums 404 to determine whether the random number 440 is greater than or equal to each of the cumulative sums 404. In cases where the random number 440 is greater than or equal to a particular cumulative sum, the cumulative sum is replaced with a value of 1. In cases where the random number 440 is less than a particular cumulative sum, the cumulative sum is replaced with a value of 0.

The comparisons can occur in parallel. For example, in the illustrated example, 64 comparison can occur at the same time, with one comparison being performed for every memory partition. In this example, 16 iterations of 64 comparisons occur. As a result of the comparisons, the first column 410 includes all 1 values, the second column 412 includes a 1 value in the first position and 0 values in all other partitions, and all other partitions until the last column 418 include only 0 values.

In the example of FIG. 4A, the results of the comparisons replace the cumulative sums 404 in the memory partitions. In other examples, the results can be placed in a different location in each partition, or in entirely different partitions.

FIG. 4B illustrates a second step in selecting a particular value. In this step, a summation is computed over the comparison results in each memory partition, meaning that each of the comparison results in one column are added together. The summations for each column can occur in parallel, with (in this example) 64 additions happening at the same time. In this example, 16 iterations of 64 parallel additions occur in obtaining the final result, which is 64 sums.

The result of the summations in the step illustrated in FIG. 4B is a counting occurrences of 1 values in each memory partition. FIG. 4C illustrates use of these counts 430 to determine the index of the original numerical value (e.g., the numerical values illustrated in FIG. 3A), that is not greater than the random number 440. The index can be determined by determining a count of occurrences of 1 values across each of the memory partitions, which can be determined by summing the counts 430 computed for each memory partition in the previous step. To sum these counts 430, the counts 430 can first be copied from the individual partitions to one partition. For example, the counts 430 can be copied in parallel to temporary storage registers, then be serially written to the one memory partition. Once the counts 430 have been copied to the one memory partition, a sum 432 can be computed over all the counts 430. The resulting sum, provides an index (17, in this example). The index can be used for further operations, and/or the index can be used to obtain one of the original numerical values.

In some examples, instead of the summation illustrated by FIG. 4B, a cumulative sum on each column can be performed, similar to the cumulative sum that is performed in FIG. 3B. In these examples, the cumulative sums would result in the last index of each column storing a sum of all of the values in the column. The last index of each column can then be copied to a separate partition, in a similar fashion as is illustrated in FIG. 4C. Once the sums from the individual columns are in one partition, the sums can then be added together, as in the step of FIG. 4C, or a cumulative sum can be computed over the sums, with the last sum (e.g., the sum in the last index) determining the index.

Figure 5:
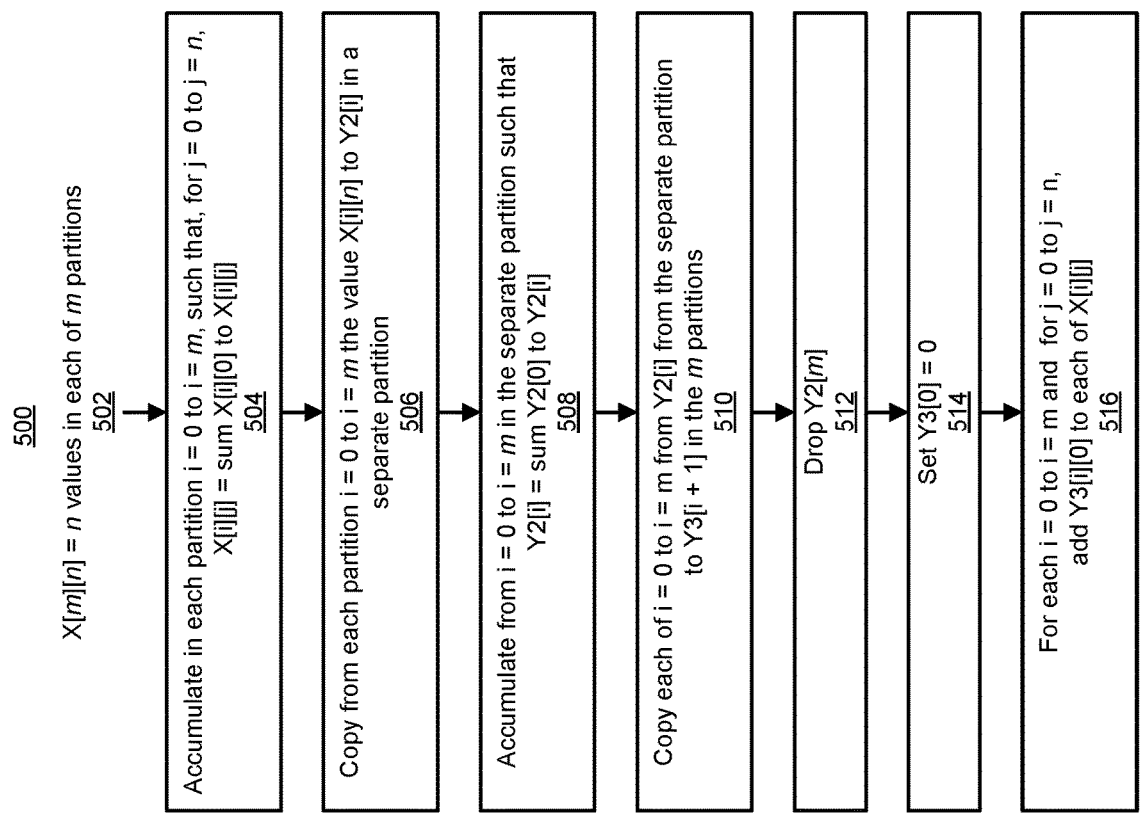
FIG. 5 includes a flowchart illustrating an example of a process for determining cumulative sums for numerical values that represent probabilities in a multinomial distribution.

FIG. 5 includes a flowchart illustrating an example of a process 500 for determining cumulative sums for a numerical values that represent probabilities in a multinomial distribution. The process 500 can be executed, for example, by an integrated circuit device. For example, the steps of the process 500 can be implemented as program instructions for the integrated circuit device.

The process 500 takes as input X[m] [n] 502, which is a two dimensional array of numerical values. The first index of X indicates a memory partition, and the second index of X indicates a particular value in each memory partition. As discussed previously, each memory partition can be read and written by an execution unit of an execution engine, and one execution unit is not able to access the memory partition of another execution unit. Data from any partition, however, can be written to temporary registers, which can store a limited amount of data (e.g., one data word per register). In the example of FIG. 5, there are m memory partitions each storing n numerical values. In other examples, the memory partitions can be storing different numbers of values. In these examples, the process 500 is essentially the same.

At the start of the process 500, the values X[m] [n] 502 have previously been stored in the memory partitions. For example, the values X[m][n] may have been generated by a computation performed by the integrated circuit device, where the computation includes parallel generation of the values and parallel storing of the values into the memory partitions. As another example, the values may have been read into the integrated circuit device's internal memory from an external memory, such as host or system memory.

At step 504, process 500 includes performing cumulative sums in each partition. For example, given an index i that is incremented from 0 to m and an index j that is incremented from 0 to n, the values in X are modified as follows: X[i][j]=sum X[i][0] to X[i][j]. In this example, X[i][0] to X[i][j] means X[i][0]=0+X[i][0], X[i][1]=0+X[i][0]+X[i][1], X[i][2]=0+X[i][1]+X[i][2], and so on. Also in this example, the cumulative sums for each index i can be performed in parallel, since there is no dependency between the result of summing the values in one partition on summing the values in any other partition. Thus, the amount of time to perform step 504 is approximately equal to n times the amount of time to perform one sum. In this example, the values in X are overwritten. In other examples, the cumulative sums can be stored in another location, either in the same memory partitions or in different memory partitions.

At step 506, the process 500 includes copying from each partition the cumulative sum at the last index X[i][n], and writing these values to a separate partition. For example, given an index i that is incremented from 0 to m, the value X[i][n] is copied to a Y2[i] in the separate partition. In this example, Y2 is a single dimension array having m indices, which is in one partition (e.g., the separate partition). In various examples, step 506 can be performed first by reading X[i] [n] from each partition in parallel into the temporary registers (a single-step operation), and then serially writing the registers from the temporary registers to the separate memory partition (an m step operation).

At step 508, the process 500 includes performing a cumulative sum on the values in Y2. For example, given an index i that is incremented from 0 to m, the values of Y2 are modified as follows: Y2[i]=sum Y2[0] to Y2[i]. That is, Y2[0]=0+Y2[0], Y2[1]=0+Y2[0]+Y2[1], Y2[2]=0+Y2[0]+Y2[1]+Y2[2], and so on. These sums are computed on data in the same partition, and thus the amount of time for performing step 508 is m times the amount of time to perform one addition. The end result of step 508 is a horizontal sum across the partitions of the largest value in each of the partitions, computed in a separate partition in view to bypass the boundaries between the partitions.

At step 510, the process 500 includes copying the cumulative sums computed in step 508 back to the original m partitions, shifted by 1 index. For example, given an index i that is incremented from 0 to m, Y2[i] is copied to Y3[i+1]. Y3 is a one dimensional array whose first index indicates a partition. In this example, Y3[i] indicates a same partition as is indicated by X[i]. The Y2 values are copied into the partitions shifted by one partition so that cumulative sums across the partitions can now be calculated.

At step 512, the process 500 includes dropping the largest of the cumulative sums computed at step 508, Y2[m]. This value is equal to the largest cumulative sum that will be computed, and thus is not needed for computing the cumulative sums across the partitions.

At step 514, the process 500 includes setting Y3[0] equal to 0. This is done so that the next step can be performed in parallel on each of the partitions, without needing to treat partition zero differently.

At step 516, the process 500 includes adding one of the cumulative sums computed at step 510 to each value in a partition. For example, given an index i that is incremented from 0 to m and an index j that is incremented from 0 to n, the values in X are modified as follows: X[i][j]=X[i][j]+Y3[i]. In this example, the additions in each partition can occur in parallel, such that m additions can be performed at the same time. The amount of time performing step 516 takes is thus n times the amount of time for performing one addition.

In this example, the values in X are replaced through the operation of step 516. In other examples, the cumulative sums can be stored in different locations in the same memory partitions or in different memory partitions, so that the values in X before step 516 is completed are still available.

When step 516 is complete, X will be storing cumulative sums of the original X[m][n] 502 with which the process 500 started. The values in X can next be used to randomly select one of the original X[m][n] 502 values.

Figure 6:
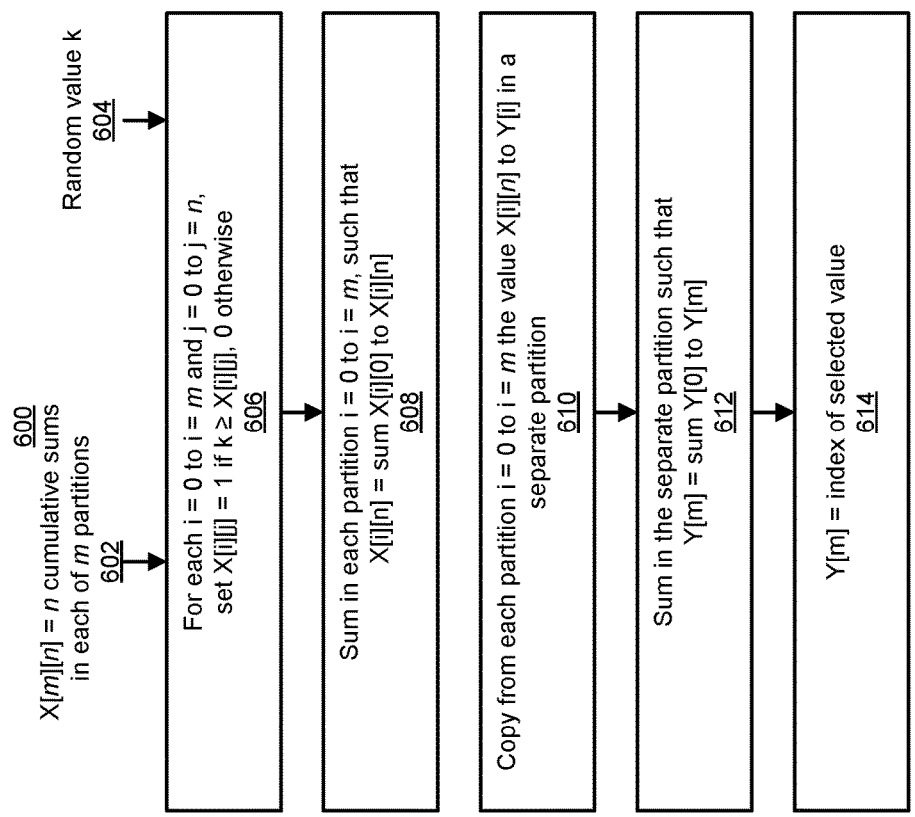
FIG. 6 includes a flowchart illustrating an example of a process for using a set of cumulative sums to determine an index, which can then be used to obtain a particular numerical value.

FIG. 6 includes a flowchart illustrating an example of a process 600 for using a set of cumulative sums to determine an index, which can then be used to obtain a particular numerical value. The process 600 can be executed, for example, by an integrated circuit device. For example, the steps of the process 600 can be implemented as program instructions for the integrated circuit device.

The process 600 takes as input X[m] [n] 602, which is a two dimensional array of cumulative sums computed according to the process illustrated in FIG. 5. The first index of X[m][n] 602 of FIG. 6 indicates a memory partition, and the second index indicates a particular cumulative sum in a memory partition. In various examples, the values in X[m][n] 602 were previously stored in the memory partitions when the process 600 begins.

The process 600 also takes as input a random value k 604. The k 604 value can be a number that is between 0 and the largest cumulative sum (e.g., the value stored X[m][n]). The k 604 value can be generated using a random number generator configured to output evenly distributed random numbers. In some examples, k 604 can be scaled to the range of values covered by the original numerical values. For example, k 604 may be a 16-bit, 32-bit, 64-bit, or other size random value, and the original numerical values may be within a range of 0 to 100. In this example, k 604 can be scaled to be between 0 and 100.

The k 604 indicates the particular index to be selected. The steps of the process 600 is how the index is determined.

At step 606, the process 600 includes comparing k 604 against each value in X. For example, given an index i that is incremented form 0 to m and an index j that is incremented from 0 to n, the values in X are modified as follows: $X[i][j]=1$ if $k \geq X[i][j]$; else 0. In this example, when k 604 is greater than or equal to a value at $X[i][j]$, then $X[i][j]$ is set equal to 1, and when k 604 is less than the value at $X[i][j]$, then $X[i][j]$ is set equal to 0. The values in X are replaced by 1 or 0 in this example. In other examples, results of the comparisons can be stored in different locations in the memory partitions, or in different memory partitions.

The comparisons of values in different memory partitions can occur in parallel. For example, m comparisons can occur at the same time. Performing step 606 thus takes n times the amount of time required by one comparison.

At step 608, the process 600 includes summing the comparison results in each of the memory partitions. For example, given an index i that is incremented from 0 to m, the values in X can be modified as follows: $X[i][n]=$sum $X[i][0]$ to $X[i][n]$. In this example, the sum is stored in the last index $X[i][n]$. In other examples, the sum can be stored elsewhere in the partition i, or in another partition, so that the value of $X[i][n]$ is not modified. Once this operation is complete, each $X[i][n]$ will be storing a count of the number of one values in the partition i.

The count of ones produced at step 608 is per partition. The remaining steps are for determining the number of ones across partitions. At step 610, the process 600 includes copying the sums from each partition into a separate partition. For example, given an index i that is incremented from 0 to m, the values $X[i][n]$ can be copied to $Y[i]$ in the separate partition. Y is a one dimensional array in the separate partition, having m indices.

Step 612 of the process 600 includes summing the values in the separate partition. For example, the values in Y can be modified as follows: $Y[m]=$sum $Y[0]$ to $Y[m]$.

Once step 612 is completed, a count of all the ones determined at step 606 is obtained. At step 614, this count can be determined by reading the value at $Y[m]$. This value indicates an index of a particular value from the original numerical values ($X[m][n]$ 502 in FIG. 5) that is less than or equal k 604 and not greater than k 604 (which would be the case for the value at the index $Y[m]+1$). In various examples, the value at $Y[m]$ can be used for additional computations, and/or to obtain a value from the original numerical values.

FIG. 7 includes a flowchart illustrating an example of a process 700 for selecting a value based on a multinomial distribution. The example process 700 can be implemented by an integrated circuit device, such as a device that includes memory banks that can store the data operated on and/or generated by the steps of the process 700 and an execution engine that can perform the steps of the process 700. In some examples, the steps of the process 700 can be implemented as program instructions for an integrated circuit device.

At step 702, the process 700 includes computing first cumulative sums on numerical values stored in memory banks of the integrated circuit device. The sets of the numerical values are each stored in different memory banks, each memory bank having a bank identifier. Each first cumulative sum is computed in parallel on a respective set of the numerical values in a respective memory bank. In some examples, the numerical values each indicate a probability of being the particular numerical value determined at step 714.

In some examples, the integrated circuit device is configured such that data cannot be read from one memory bank and be written directly to another memory bank. In some examples, can be read from one memory bank and written to another memory bank indirectly using a register of the integrated circuit device.

In some examples, the process 700 further includes performing a computation that produces the numerical values, such as softmax or another function that produces a range of probabilities.

At step 704, the process 700 includes computing second cumulative sums on a set of the first cumulative sums, the set of the first cumulative sums including a first cumulative sum from each of the memory banks. In some examples, the first cumulative sum that is used for computing the second cumulative sums is a last of the cumulative sums in each of the memory banks, where the last of the cumulative sums can be determined from the indices of the cumulative sums in a memory bank. In some examples, the process 700 includes copying, before performing the second cumulative sum, the set of first cumulative sums from the memory banks to a separate memory bank. In these examples, the cumulative sum is performed on the data in the separate memory bank (e.g., the set of first cumulative sums).

At step 706, the process 700 includes adding to each first cumulative sum a second cumulative sum from the second cumulative sums. The second cumulative sum that is added to each respective set of the first cumulative sums in a memory bank is from a memory bank with a bank identifier that is one less than a bank identifier for the memory bank storing the respective set of the first cumulative sums. That is, the second cumulative sums are shifted by one from the memory banks from which the values used to compute the second cumulative sums were copied. The shifting enables the cumulative sums to be carried across from one memory bank to the next. The adding can occur in parallel on the respective set of the first cumulative sums in the respective memory bank.

At step 708, the process 700 includes comparing a random value generated by the integrated circuit device against each of the first cumulative sums. The comparing includes determining whether the random value is greater than or equal to each of the first cumulative sums. In some examples, the random value is generated using a random number generator that produces evenly distributed random numbers. In some examples, the numerical values from step 702 are within a range having a minimum value and a maximum value. In these examples, the random value is scaled to be greater than or equal to the minimum value and less than or equal to the maximum value.

At step 710, the process 700 includes storing results of the comparing in the memory banks, wherein sets of the results are each stored in different memory banks. The results can be stored in a similar arrangement as the original numerical values, with each memory bank having one result for each numerical value stored in the memory bank.

At step 712, the process 700 includes computing a first set of sums on the sets of the results. The first set of sums includes a sum for each of the sets of the results, meaning that a sum is computed over each set of results in each memory bank. Each of the first set of sums can be computed in parallel on a respective set of the results in a respective memory bank.

At step 714, the process 700 includes computing a second sum on the first set of sums, meaning that each of the first set of sums is added together to produce the second sum. The second sum is an index of a particular numerical value of the numerical values in step 702. In some examples, the process 700 includes copying, before computing the second sum, the first set of sums the memory banks to a separate, single memory bank. In these examples, the second sum is performed on data in the separate memory bank (e.g., the first set of sums).

At step 716, the process 700 includes outputting the index.

In some examples, the process 700 further includes performing a computation using the index. In some examples, the process 700 further includes obtaining the numerical value that corresponds to the index, for example by using the index to determine the memory bank where the numerical value is located, and then the address where the numerical value can be found within the memory bank.

Figure 8:
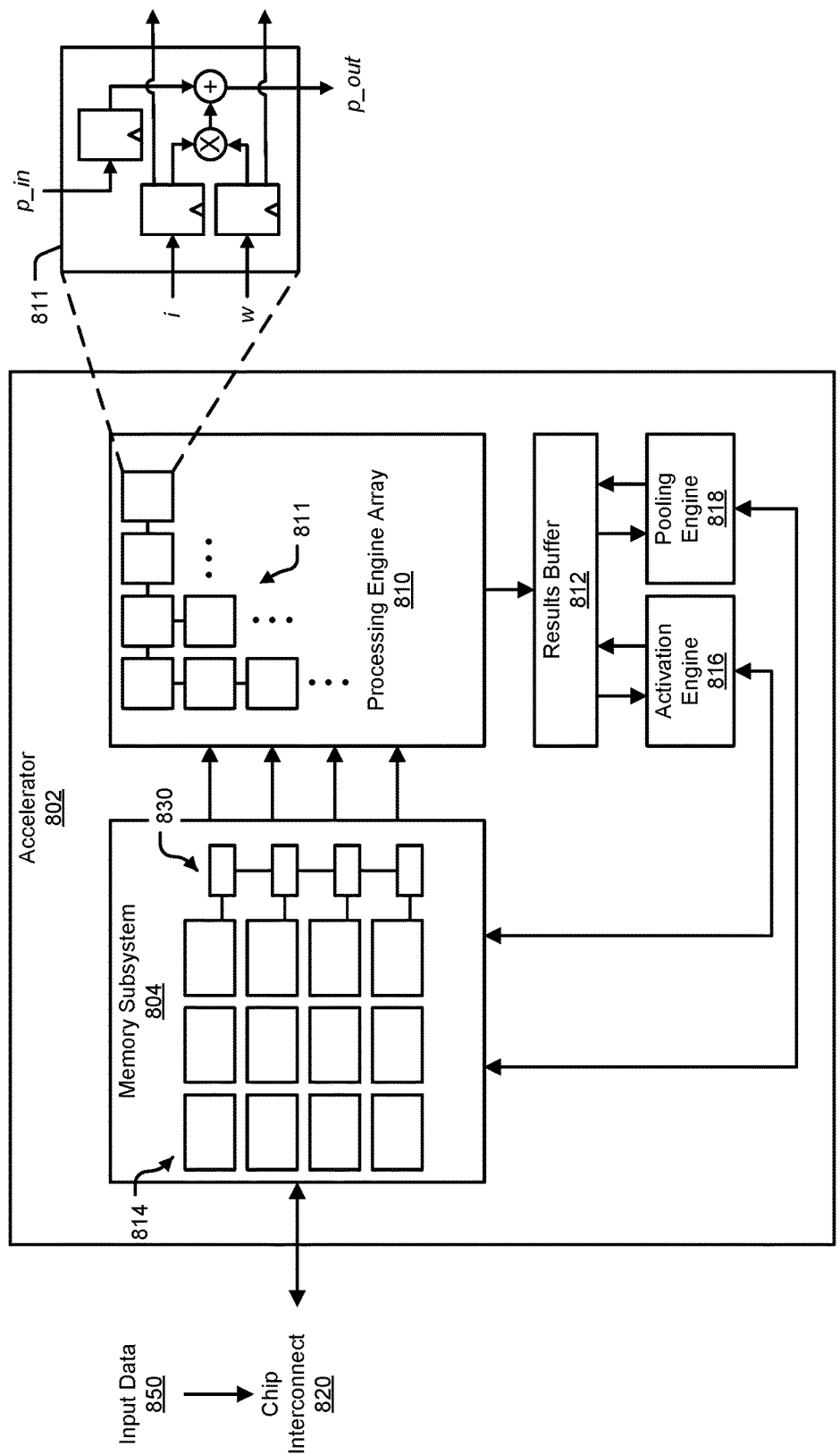
FIG. 8 is a block diagram illustrating an example of an integrated circuit device.

FIG. 8 is a block diagram illustrating an example of an integrated circuit device that can be used to select a value based on a multinomial distribution. The example of FIG. 8 illustrates an accelerator engine 802. In various examples, the accelerator engine 802, for a set of input data (e.g., input data 850), can execute computations using a processing engine array 810, an activation engine 816, and/or a pooling engine 818. In some examples, the example accelerator engine 802 may be an integrated circuit component of a processor, such as a neural network processor. The processor may have other integrated circuit components, including additional accelerator engines.

In various implementations, the memory subsystem 804 can include multiple memory banks 814. In these implementations, each memory bank 814 can be independently accessible, meaning that the read of one memory bank is not dependent on the read of another memory bank. Similarly, writing to one memory bank does not affect or limit writing to a different memory bank. In some cases, each memory bank can be read and written at the same time. Various techniques can be used to have independently accessible memory banks 814. For example, each memory bank can be a physically separate memory component that has an address space that is separate and independent of the address spaces of each other memory bank. In this example, each memory bank may have at least one read channel and may have at least one separate write channel that can be used at the same time. In these examples, the memory subsystem 804 can permit simultaneous access to the read or write channels of multiple memory banks. As another example, the memory subsystem 804 can include arbitration logic such that arbitration between, for example, the outputs of multiple memory banks 814 can result in more than one memory bank's output being used. In these and other examples, though globally managed by the memory subsystem 804, each memory bank can be operated independently of any other.

Having the memory banks 814 be independently accessible can increase the efficiency of the accelerator 802. For example, values can be simultaneously read and provided to each row of the processing engine array 810, so that the entire processing engine array 810 can be in use in one clock cycle. As another example, the memory banks 814 can be read at the same time that results computed by the processing engine array 810 are written to the memory subsystem 804. In contrast, a single memory may be able to service only one read or write at a time. With a single memory, multiple clock cycles can be required, for example, to read input data for each row of the processing engine array 810 before the processing engine array 810 can be started.

In various implementations, the memory subsystem 804 can be configured to simultaneously service multiple clients, including the processing engine array 810, the activation engine 816, the pooling engine 818, and any external clients that access the memory subsystem 804 over a communication fabric 820. In some implementations, being able to service multiple clients can mean that the memory subsystem 804 has at least as many memory banks as there are clients. In some cases, each row of the processing engine array 810 can count as a separate client. In some cases, each column of the processing engine array 810 can output a result, such that each column can count as a separate write client. In some cases, output from the processing engine array 810 can be written into the memory banks 814 that can then subsequently provide input data for the processing engine array 810. As another example, the activation engine 816 and the pooling engine 818 can include multiple execution channels, each of which can be separate memory clients. The memory banks 814 can be implemented, for example, using static random access memory (SRAM).

In various examples, the memory subsystem 804 can include a set of registers 830 for temporary storage of data. The memory subsystem 804 can include, for example, a register for each of the memory banks 814 or for a subset of the memory banks 814. In some examples, there is a one-to-one correspondence between each register and a memory bank, such that data can be moved between one register and a corresponding memory bank, and cannot be moved between the register and a different memory bank. In these and other examples, the memory subsystem 804 may be able to read values from each of the registers 830, independently of the registers' association with the memory banks 814. For example, the registers 830 may be chained, such that a value can be read from one register and be written to a neighboring register. Alternatively or additionally, the memory subsystem 804 can include circuitry that can read from one or more of the registers 830 and can write to one or more of the registers 830.

Using the registers 830, the memory subsystem 804 can, for example, copy data from a set of memory banks 814 and store the data in the registers 830. In this example, the memory subsystem 804 can later copy the data from the registers 830 back into the memory banks 814. The registers 830 may support parallel and serial reads or writes. For example, in parallel mode, the memory subsystem 804 can read two or more of the memory banks 814 at the same time, and store the data that is read into respective registers. In this example, the memory subsystem 804 can also copy data from one or more of the registers into respective memory banks. As a further example, in serial mode, the memory subsystem 804 can read multiple values from one memory bank and store the values into the registers 830, with each value being stored in a different register. In this example, the memory subsystem 804 can also copy values from each of two or more of the registers 830, and write these values to one memory bank. As discussed further below, the memory subsystem 804 can use parallel and serial operations to move data between the memory banks 814.

In various implementations, the memory subsystem 804 can include control logic. The control logic can, for example, keep track of the address spaces of each of the memory banks 814, identify memory banks 814 to read from or write to, and/or move data between the memory banks 814 and a set of registers 830. In some implementations, memory banks 814 can be hardwired to particular clients. For example, a set of memory banks 814 can be hardwired to provide values to the rows of the processing engine array 810, with one memory bank servicing each row. As another example, a set of memory banks can be hired wired to receive values from columns of the processing engine array 810, with one memory bank receiving data for each column.

In various examples, the registers 830 can, alternatively, be located in a different component of the accelerator, such as, for example, the pooling engine 818. In this example, the pooling engine 818 can include control logic for moving data into or out of the registers 830. Other examples of components of the accelerator where the registers can be located include the activation engine 816, the results buffer 812, or another component that is not illustrated here.

The processing engine array 810 is the computation matrix of the example accelerator 802. The processing engine array 810 can, for example, execute parallel integration, convolution, correlation, and/or matrix multiplication, among other things. The processing engine array 810 includes multiple processing engines 811, arranged in rows and columns, such that results output by one processing engine 811 can be input directly into another processing engine 811. Processing engines 811 that are not on the outside edges of the processing engine array 810 thus can receive data to operate on from other processing engines 811, rather than from the memory subsystem 804.

In various examples, the processing engine array 810 uses systolic execution, in which data arrives at each processing engine 811 from different directions at regular intervals. In some examples, input data can flow into the processing engine array 810 from the left and weight values can be loaded at the top. In some examples weights and input data can flow from the left and partial sums can flow from top to bottom. In these and other examples, a multiply-and-accumulate operation moves through the processing engine array 810 as a diagonal wave front, with data moving to the right and down across the array. Control signals can be input at the left at the same time as weights, and can flow across and down along with the computation.

In various implementations, the number of columns in the processing engine array 810 determines the computational capacity of the processing engine array 810, and the number of rows determines the required memory bandwidth for achieving maximum utilization of the processing engine array 810. The processing engine array 810 can have, for example, 64 columns and 428 rows, or some other number of columns and rows.

An example of a processing engine 811 is illustrated in FIG. 8 in an inset diagram. As illustrated by this example, a processing engine 811 can include a multiplier-accumulator circuit. Inputs from the left can include, for example, input data i and a weight value w, where the input data is a value taken from either a set of input data or a set of intermediate results, and the weight value is from a set of weight values that connect one layer of the neural network to the next. A set of input data can be, for example, an image being submitted for identification or object recognition, an audio clip being provided for speech recognition, a string of text for natural language processing or machine translation, or the current state of a game requiring analysis to determine a next move, among other things. In some examples, the input data and the weight value are output to the right, for input to the next processing engine 811.

In the illustrated example, an input from above can include a partial sum, p_in, provided either from another processing engine 811 or from a previous round of computation by the processing engine array 810. When starting a computation for a new set of input data, the top row of the processing engine array 810 can receive a fixed value for p_in, such as zero. As illustrated by this example, i and w are multiplied together and the result is summed with p_in to produce a new partial sum, p_out, which can be input into another processing engine 811. Various other implementations of the processing engine 811 are possible.

Outputs from the last row in the processing engine array 810 can be temporarily stored in the results buffer 812. The results can be intermediate results, which can be written to the memory banks 814 to be provided to the processing engine array 810 for additional computation. Alternatively, the results can be final results, which, once written to the memory banks 814 can be read from the memory subsystem 804 over the communication fabric 820, to be output by the system.

In some implementations, the accelerator 802 includes an activation engine 816. In these implementations, the activation engine 816 can combine the results from the processing engine array 810 into one or more output activations. For example, for a convolutional neural network, convolutions from multiple channels can be summed to produce an output activation for a single channel. In other examples, accumulating results from one or more columns in the processing engine array 810 may be needed to produce an output activation for a single node in the neural network. In some examples, activation engine 816 can be bypassed.

In various examples, the activation engine 816 can include multiple separate execution channels. In these examples, the execution channels can correspond to the columns of the processing engine array 810, and can perform an operation on the outputs of a column, the result of which can be stored in the memory subsystem 804. In these examples, the activation engine 816 may be able to perform between 1 and n parallel computations, where n is equal to the number of columns in the processing engine array 810. In some cases, one or more of the computations can be performed simultaneously. Examples of computations that each execution channel can perform include exponentials, squares, square roots, identities, binary steps, bipolar steps, sigmoidals, and ramps, among other examples.

In some implementations, the accelerator 802 can include a pooling engine 818. Pooling is the combining of outputs of the columns of the processing engine array 810. Combining can include for example, computing a maximum value, a minimum value, an average value, a median value, a summation, a multiplication, or another logical or mathematical combination. In various examples, the pooling engine 818 can include multiple execution channels that can operating on values from corresponding columns of the processing engine array 810. In these examples, the pooling engine 818 may be able to perform between 1 and n parallel computations, where n is equal to the number of columns in the processing engine array 810. In various examples, execution channels of the pooling engine 818 can operate in parallel and/or simultaneously. In some examples, the pooling engine 818 can be bypassed.

Herein, the activation engine 816 and the pooling engine 818 may be referred to collectively as execution engines. The processing engine array 810 is another example of an execution engine. Another example of an execution engine is a Direct Memory Access (DMA) engine, which may be located outside the accelerator 802.

Input data 850 can arrive over the communication fabric 820. The communication fabric 820 can connect the accelerator 802 to other components of a processor, such as a DMA engine that can obtain input data 850 from an Input/Output (I/O) device, a storage drive, or a network interface. The input data 850 can be, for example one-dimensional data, such as a character string or numerical sequence, or two-dimensional data, such as an array of pixel values for an image or frequency and amplitude values over time for an audio signal. In some examples, the input data 850 can be three-dimensional, as may be the case with, for example, the situational information used by a self-driving car or virtual reality data. In some implementations, the memory subsystem 804 can include a separate buffer for the input data 850. In some implementations, the input data 850 can be stored in the memory banks 814 when the accelerator 802 receives the input data 850.

In some examples, the accelerator 802 can implement a neural network processing engine. In these examples, the accelerator 802, for a set of input data 850, can execute a neural network to perform a task for which the neural network was trained. Executing a neural network on a set of input data can be referred to as inference or performing inference.

The weights for the neural network can be stored in the memory subsystem 804, along with input data 850 on which the neural network will operate. The neural network can also include instructions, which can program the processing engine array 810 to perform various computations on the weights and the input data. The instructions can also be stored in the memory subsystem 804, in the memory banks 814 or in a separate instruction buffer. The processing engine array 810 can output intermediate results, which represent the outputs of individual layers of the neural network. In some cases, the activation engine 816 and/or pooling engine 818 may be enabled for computations called for by certain layers of the neural network. The accelerator 802 can store the intermediate results in the memory subsystem 804 for inputting into the processing engine array 810 to compute results for the next layer of the neural network. The processing engine array 810 can further output final results from a last layer of the neural network. The final results can be stored in the memory subsystem 804 and then be copied out to host processor memory or to another location.

Figure 9:
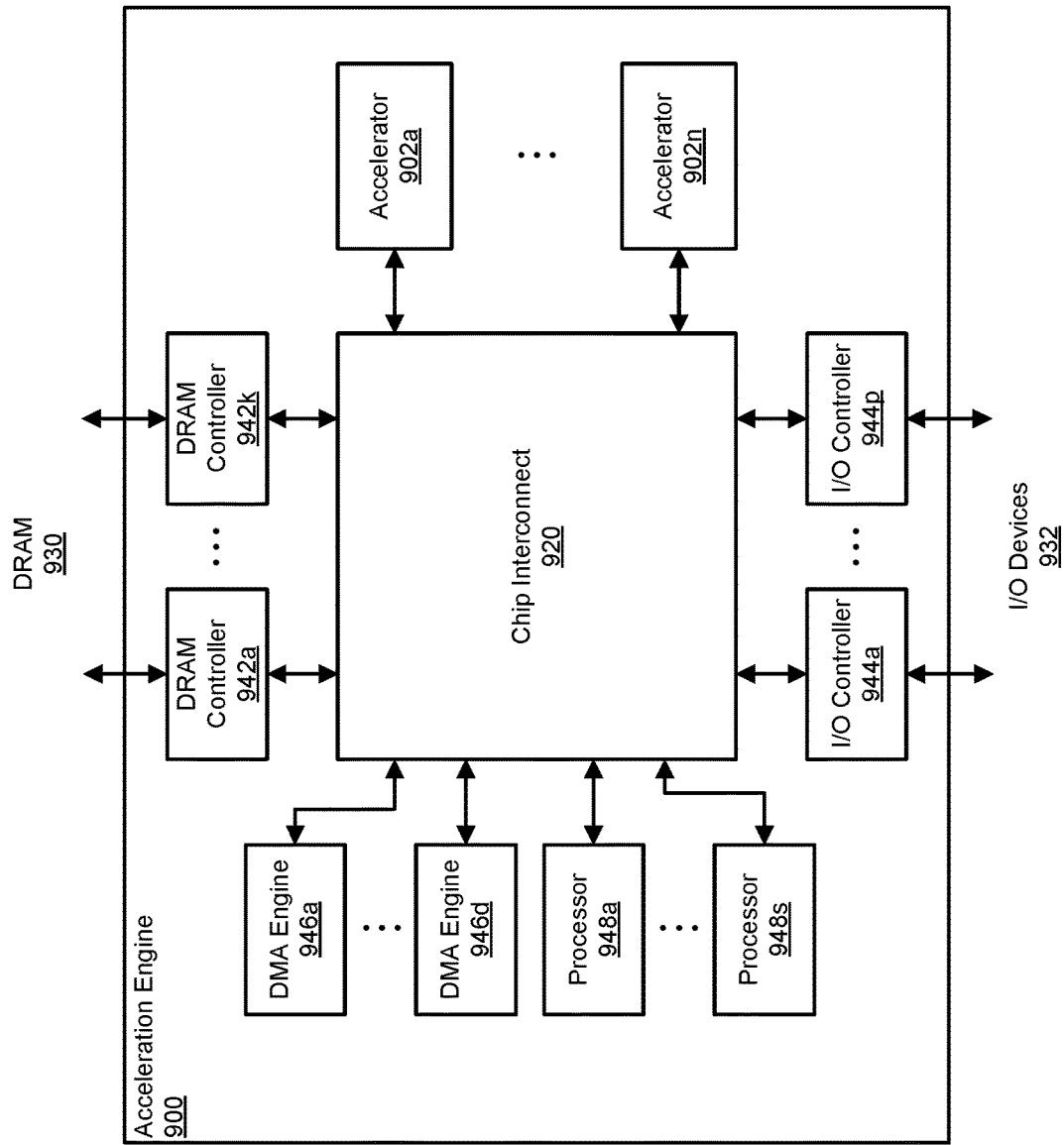
FIG. 9 includes a block diagram that illustrates an example of an acceleration engine.

FIG. 9 includes a block diagram that illustrates an example of an acceleration engine 900. The acceleration engine 900 is an example of an integrated circuit that can include one or more accelerators 902a-902n that may be similar to the accelerator illustrated in FIG. 8.

In the example of FIG. 9, the acceleration engine 900 includes multiple accelerators 902a-902n, each of which can perform a set of operations. In various examples, the accelerators 902a-902n for particular types of operations, so that the accelerators 902a-902n can perform the operations much faster than when similar operations are performed by a general purpose processor. In various examples, to perform a set of operations, input data on which the operations are to be performed must first be moved into the accelerators 902a-902n. Additionally, in some cases, program code is also moved into the accelerators 902a-902n, which programs the operations that the accelerators 902a-902n will perform on the data. In the illustrated example, the acceleration engine 900 includes n accelerators 902a-902n. Examples of accelerators that can be included in the acceleration engine 900 include graphics accelerators, floating point accelerators, neural network accelerators, and others. In various examples, the accelerators 902a-902n can each be the same (e.g., each of the is a graphics accelerator) or can be different (e.g., the accelerators 902a-902n include a graphics accelerator, a floating point accelerator, and neural network accelerator).

The example acceleration engine 900 further includes DRAM controllers 942a-942k for communicating with an external memory. The external memory is implemented, in this example, using DRAM 930. In the illustrated example, the acceleration engine 900 includes k DRAM controllers 942a-942k, each of which may be able to communicate with an independent set of banks of DRAM. In other examples, other types of RAM technology can be used for the external memory. The DRAM controllers 942a-942k can also be referred to as memory controllers.

In various examples, input data and/or program code for the accelerators 902a-902n can be stored in the DRAM 930. Different programs can cause the accelerators 902a-902n to perform different operations. For example, when one of the accelerators is a neural network accelerator, one program can configure the neural network accelerator to perform speech recognition while another program can configure the neural network accelerator to perform image recognition. In various examples, different accelerators 902a-902n can be programmed with different programs, so that each performs a different set of operations. In various examples, the processors 948a-948s can manage moving of program code from the DRAM 930 to the accelerators 902a-902n.

The example acceleration engine 900 further includes I/O controllers 944a-944p for communicating with I/O devices 932 in the system. The acceleration engine 900 can communicate with I/O devices over, for example, a processor bus. In some examples, the processor bus can be implemented using Peripheral Component Interconnect (PCI) and/or a variation of the PCI bus protocol. The processor bus can connect the acceleration engine 900 to I/O devices such as, for example, input and output devices, memory controllers, storage devices, and/or network interface cards, among other things. In some examples, the I/O controllers 944-944p can enable the acceleration engine 900 to act as an I/O device for a host processor. For example, the acceleration engine 900 can be the recipient of input data from the host processor, and a command indicating an operation to be performed on the input data (e.g., a particular computation or analysis). In the illustrated example, the acceleration engine 900 includes p I/O controllers 944a-944p, each of which may include a separate root complex and may communicate with a separate set of I/O devices 932. In other examples, other standardized bus protocols, such as Ultra Path Interconnect (UPI) can be used for the host bus. In other examples, a proprietary bus protocol can be used.

Movement of data in the acceleration engine 900 can be managed by one or more processors 948a-948s, which can also be referred to as data management processors. In the example of FIG. 9, the acceleration engine 900 includes s processors 948a-948s incorporated into (e.g., on the same silicon die) the device. In other examples, the processors 948a-948s can be external to the acceleration engine 900 (e.g., on a different die and/or in a different package). In some examples, the processors 948a-948s can manage the movement of data from I/O devices 932 to the accelerators 902a-902n or the DRAM 930. For example, input data may be located at an I/O device 932 or in processor memory, and the processors 948a-948s can move the input from the I/O device 932 or processor memory into an accelerator or into DRAM 930. As another example, program code for the accelerators 902a-902n may be located on an I/O device 932 or in processor memory.

The example acceleration engine 900 further includes DMA engines 946a-946d that can move data between the accelerators 902a-902n, DRAM controllers 942a-942k, and I/O controllers 944a-944p. In the illustrated example, the acceleration engine 900 includes d DMA engines 946a-946d. In some implementations, the DMA engines 946a-946d can be assigned to specific tasks, such as moving data from the DRAM controllers 942a-942d to the accelerators 902a-902n, or moving data between the I/O controllers 944a-944p and the accelerators 902a-902n. These tasks can be assigned, for example, by enqueueing descriptors with the DMA engines 946a-946d, where a descriptor identifies an address for a block of data and an operation (e.g., a read or a write) to perform. A descriptor, for example, can direct a DMA engine to instruct a DMA controller to read a block of data from DRAM 930. A descriptor can, as a further example, instruct the DMA engine to write data, read by the DMA controller, to an accelerator. Further descriptors can be used to move data from an accelerator to DRAM 930.

In various examples, each of the processors 948a-948s can be responsible for managing the data movement for a different accelerator. In some examples, a processor may manage the data movement for more than one accelerator. Similarly, in various examples, each of the processors 948a-948s can be assigned to one or more DMA engines 946a-946d. In these and other examples, associations between processors 948a-948s, accelerators 902a-902n, and DMA engines 946a-946d is determined by program code being executed by each respective processor.

In the example acceleration engine 900, the various components can communicate over a chip interconnect 920. The chip interconnect 920 primarily includes wiring for routing data between the components of the acceleration engine 900. In some cases, the chip interconnect 920 can include a minimal amount of logic, such as multiplexors to control the direction of data, flip-flops for handling clock domain crossings, and timing logic.

Figure 10:
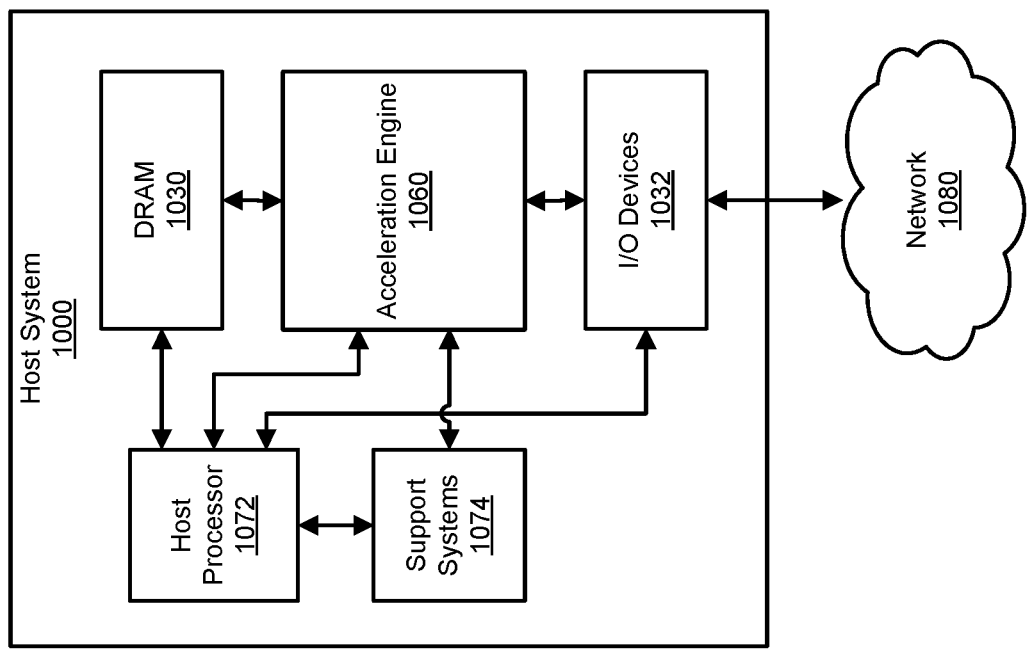
FIG. 10 includes a block diagram that illustrates an example of a host system.

FIG. 10 includes a block diagram that illustrates an example of a host system 1000 in which an acceleration engine 1060 can be used. The acceleration engine 1060 of FIG. 10 is an example of a device that can include one or more accelerator engines such as is illustrated in FIG. 9. The example host system 1000 of FIG. 10 includes the acceleration engine 1060, a host processor 1072, DRAM 1030 or processor memory, I/O devices 1032, and support systems 1074. In various implementations, the host system 1000 can include other hardware that is not illustrated here.

The host processor 1072 is a general purpose integrated circuit that is capable of executing program instructions. In some examples, the host processor 1072 can include multiple processing cores. A multi-core processor may include multiple processing units within the same processor In some examples, the host system 1000 can include more than one host processor 1072. In some examples, the host processor 1072 and the acceleration engine 1060 can be one chip, such as, one or more integrated circuits within the same package.

In various examples, the host processor 1072 can communicate with other components in the host system 1000 over one or more communication channels. For the example, the host system 1000 can include a host processor bus, which the host processor 1072 can use to communicate with the DRAM 1030, for example. As another example, the host system 1000 can include an I/O bus, such as a PCI-based bus, over which the host processor 1072 can communicate with the acceleration engine 1060 and/or the I/O devices 1032, for example. In various examples, the host system 1000 can, alternatively or additionally, include other communication channels or busses, such as serial busses, power management busses, storage device busses, and so on.

In some examples, software programs executing on the host processor 1072 can receive or generate input for processing by the acceleration engine 1060. In some examples, the programs can select an appropriate neural network to execute for a given input. For example, a program may be for language translation, and can select one or more neural networks capable of speech recognition and/or machine translation. In these and other examples, the programs can configure the acceleration engine 1060 with the neural network to execute, and/or can select a neural network processing engine on the acceleration engine 1060 that has previously been configured to execute the desired neural network. In some examples, once the acceleration engine 1060 has started inference on input data, the host processor 1072 can manage the movement of data (such as weights, instructions, intermediate results, results of conditional layers, and/or final results) into or out of the acceleration engine 1060.

In some examples, a software program that is using the acceleration engine 1060 to conduct inference can read the result from a conditional layer from the acceleration engine 1060 and/or from a storage location, such as in DRAM 1030. In these examples, the program can determine what action the neural network should take next. For example, the program can determine to terminate the inference. As another example, the program can determine to change the direction of the inference, which can be translated by lower level code and/or the neural network processor to a next layer to execute. In these and other examples, the execution flow of the neural network can be coordinate by software.

The DRAM 1030 is memory that is used by the host processor 1072 for storage of program code that the host processor 1072 is in the process of executing, as well as values that are being operated on. In some examples, the data for a neural network (e.g., weight values, instructions, and other data) can be all or partially stored in the DRAM 1030. DRAM is a common term for processor memory, and though DRAM is volatile memory, processor memory can be volatile and/or non-volatile. Though not illustrated here, the host system 1000 can include other volatile and non-volatile memories for other purposes. For example, the host system 1000 can include a Read-Only Memory (ROM) that stores boot code for booting the host system 1000 at power on, and/or Basic Input/Output System (BIOS) code.

Though not illustrated here, the DRAM 1030 can store instructions for various programs, which can be loaded into and be executed by the host processor 1072. For example, the DRAM 1030 can be storing instructions for an operating system, one or more data stores, one or more application programs, one or more drivers, and/or services for implementing the features disclosed herein.

The operating system can manage and orchestrate the overall operation of the host system 1000, such as scheduling tasks, executing applications, and/or controller peripheral devices, among other operations. In some examples, a host system 1000 may host one or more virtual machines. In these examples, each virtual machine may be configured to execute its own operating system. Examples of operating systems include Unix, Linux, Windows, Mac OS, iOS, Android, and the like. The operating system may, alternatively or additionally, be a proprietary operating system.

The data stores can include permanent or transitory data used and/or operated on by the operating system, application programs, or drivers. Examples of such data include web pages, video data, audio data, images, user data, and so on.

The information in the data stores may, in some examples, be provided over the network(s) to user devices. In some cases, the data stores may additionally or alternatively include stored application programs and/or drivers. Alternatively or additionally, the data stores may store standard and/or proprietary software libraries, and/or standard and/or proprietary application user interface (API) libraries. Information stored in the data stores may be machine-readable object code, source code, interpreted code, or intermediate code.

The drivers can include programs that provide communication between components in the host system 1000. For example, some drivers can provide communication between the operating system and peripheral devices or I/O devices 1032. Alternatively or additionally, some drivers may provide communication between application programs and the operating system, and/or application programs and peripheral devices accessible to the host system 1000. In many cases, the drivers can include drivers that provide well-understood functionality (e.g., printer drivers, display drivers, hard disk drivers, Solid State Device drivers, etc.). In other cases, the drivers may provide proprietary or specialized functionality.

The I/O devices 1032 can include hardware for connecting to user input and output devices, such as keyboards, mice, pens, tablets, voice input devices, touch input devices, displays or monitors, speakers, and printers, among other devices The I/O devices 1032 can also include storage drives and/or network interfaces for connecting to a network 1080. For example, the host system 1000 can use a network interface to communicate with storage devices, user terminals, other computing devices or servers, and/or other networks, among various examples.

In various examples, one or more of the I/O devices 1032 can be storage devices. In these examples, the storage device include non-volatile memory and can store program instructions and/or data. Examples of storage devices include magnetic storage, optical disks, solid state disks, flash memory, and/or tape storage, among others. The storage device can be housed in the same chassis as the host system 1000 or may be in an external enclosure. A storage device can be fixed (e.g., attached by screws) or removable (e.g., having a physical release mechanism and possibly a hot-plug mechanism).

Storage devices, the DRAM 1030, and any other memory component in the host system 1000 are examples of computer-readable storage media. Computer-readable storage media are physical mediums that are capable of storing data in a format that can be read by a device such as the host processor 1072. Computer-readable storage media can be non-transitory. Non-transitory computer-readable media can retain the data stored thereon when no power is applied to the media. Examples of non-transitory computer-readable media include ROM devices, magnetic disks, magnetic tape, optical disks, flash devices, and solid state drives, among others. as used herein, computer-readable storage media does not include computer-readable communication media.

In various examples, the data stored on computer-readable storage media can include program instructions, data structures, program modules, libraries, other software program components, and/or other data that can be transmitted within a data signal, such as a carrier wave or other transmission. The computer-readable storage media can, additionally or alternatively, include documents, images, video, audio, and other data that can be operated on or manipulated through the use of a software program.

In various examples, one or more of the I/O devices 1032 can be PCI-based devices. In these examples, a PCI-based I/O device includes a PCI interface for communicating with the host system 1000. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device, to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe.

A PCI-based device can include one or more functions. A "function" describes the hardware and/or software of an operation that may be provided by the PCI-based device. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some examples, the PCI-based device can include single-root I/O virtualization (SR-IOV). SR-IOV is an extended capability that may be included in a PCI-based device. SR-IOV allows a physical resource (e.g., a single network interface controller) to appear as multiple virtual resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

In various implementations, the support systems 1074 can include hardware for coordinating the operations of the acceleration engine 1060. For example, the support systems 1074 can include a microprocessor that coordinates the activities of the acceleration engine 1060, including moving data around on the acceleration engine 1060. In this example, the microprocessor can be an integrated circuit that can execute microcode. Microcode is program code that can enable an integrated circuit to have some flexibility in the operations that the integrated circuit can execute, but because the program code uses a limited instruction set, the microprocessor may have much more limited capabilities than the host processor 1072. In some examples, the program executed by the microprocessor is stored on the hardware of microprocessor, or on a non-volatile memory chip in the host system 1000. In some examples, the microprocessor and the acceleration engine 1060 can be on chip, such as one integrated circuit on the same die and in the same package.

In some examples, the support systems 1074 can be responsible for taking instructions from the host processor 1072 when programs executing on the host processor 1072 request the execution of a neural network. For example, the host processor 1072 can provide the support systems 1074 with a set of input data and a task that is to be performed on the set of input data. In this example, the support systems 1074 can identify a neural network that can perform the task, and can program the acceleration engine 1060 to execute the neural network on the set of input data. In some examples, the support systems 1074 only needs to select an appropriate neural network processing engine of the neural network processor. In some examples, the support systems 1074 may need to load the data for the neural network onto the acceleration engine 1060 before the acceleration engine 1060 can start executing the neural network. In these and other examples, the support systems 1074 can further receive the output of executing the neural network, and provide the output back to the host processor 1072.

In some examples, the operations of the support systems 1074 can be handled by the host processor 1072. In these examples, the support systems 1074 may not be needed and can be omitted from the host system 1000.

In various examples, the host system 1000 can include a combination of host systems, processor nodes, storage subsystems, and I/O chassis that represent user devices, service provider computers or third party computers.

User devices can include computing devices to access an application (e.g., a web browser or mobile device application). In some examples, the application may be hosted, managed, and/or provided by a computing resources service or service provider. The application may enable a user to interact with the service provider computer to, for example, access web content (e.g., web pages, music, video, etc.). The user device may be a computing device such as, for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device may be in communication with the service provider computer over one or more networks. Additionally, the user device may be part of the distributed system managed by, controlled by, or otherwise part of the service provider computer (e.g., a console device integrated with the service provider computers).

The host system 1000 can also represent one or more service provider computers. A service provider computer may provide a native application that is configured to run on user devices, which users may interact with. The service provider computer may, in some examples, provide computing resources such as, but not limited to, client entities, low latency data storage, durable data storage, data access, management, virtualization, cloud-based software solutions, electronic content performance management, and so on. The service provider computer may also be operable to provide web hosting, databasing, computer application development and/or implementation platforms, combinations of the foregoing or the like. In some examples, the service provider computer may be provided as one or more virtual machines implemented in a hosted computing environment. The hosted computing environment can include one or more rapidly provisioned and released computing resources. These computing resources can include computing, networking and/or storage devices. A hosted computing environment may also be referred to as a cloud computing environment. The service provider computer may include one or more servers, perhaps arranged in a cluster, as a server farm, or as individual servers not associated with one another, and may host application and/or cloud-based software services. These servers may be configured as part of an integrated, distributed computing environment. In some examples, the service provider computer may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer may communicate with one or more third party computers.

Figure 11:
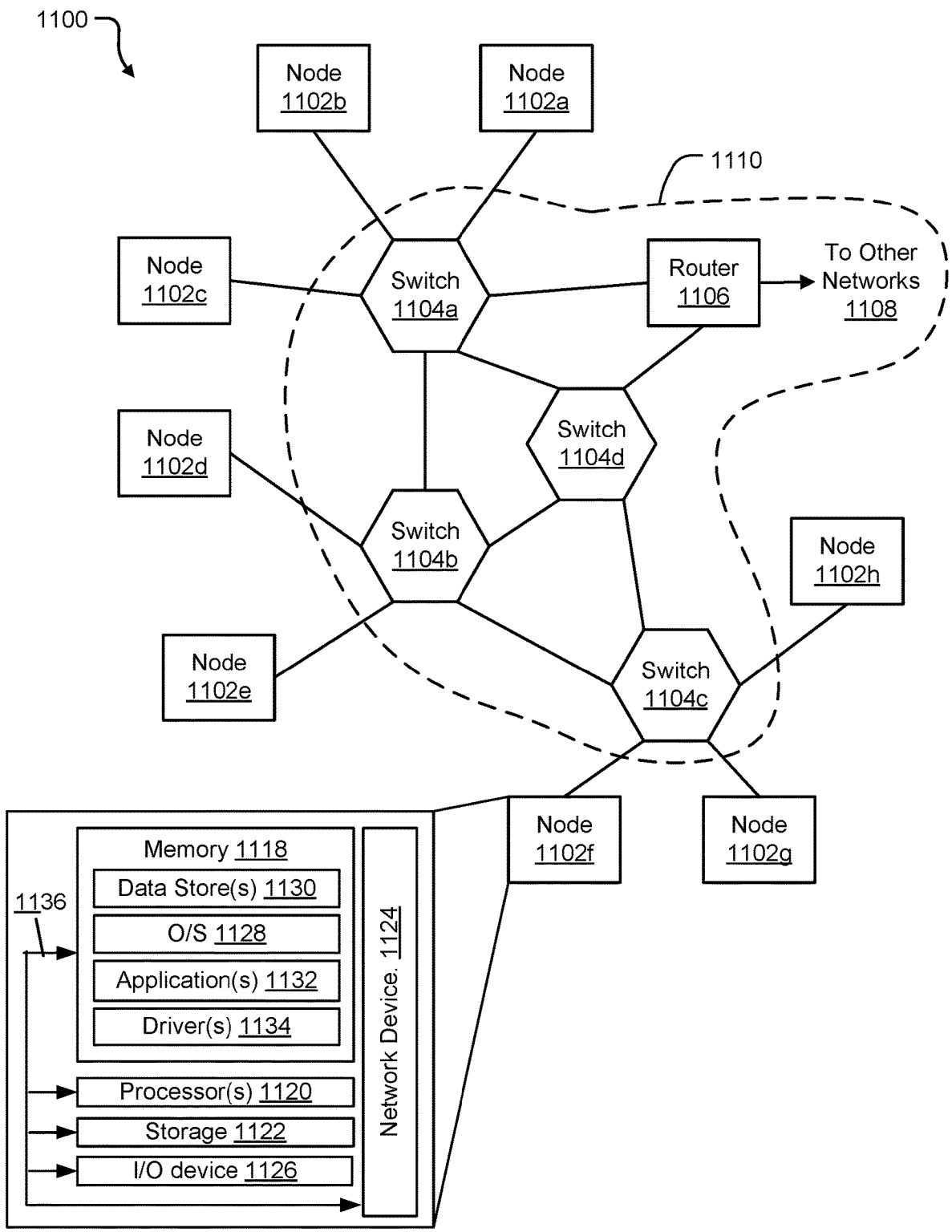
FIG. 11 includes a diagram of an example network.

FIG. 11 includes a diagram of an example network 1100, which can include one or more host systems, such as the host system illustrated in FIG. 10. For example, the example network 1100 of FIG. 11 includes multiple nodes 1102a-1102h, one or more of which can be a host system such as is illustrated in FIG. 10. Others of the nodes 1102a-1102h can be other computing devices, each of which include at least a memory for storing program instructions, a processor for executing the instructions, and a network interface for connecting to the network 1100.

In various examples, the network 1100 can be used to process data. For example, input data can be received at one of the nodes 1102a-1102h or from other networks 1108 with which the network 1100 can communicate. In this example, the input data can be directed to a node in the network 1100 that includes an acceleration engine, for the acceleration engine to operate on and produce a result. The result can then be transferred to the node or other network from which the input data was received. In various examples, input data can be accumulated from various sources, including one or more of the nodes 1102a-1102h and/or computing devices located in the other networks 1108, and the accumulated input data can be directed to one or more host systems in the network 1100. Results from the host systems can then be distributed back to the sources from which the input data was gathered.

In various examples, one or more of the nodes 1102a-1102h can be responsible for operations such as accumulating input data for host systems to operate on, keeping track of which host systems are busy and which can accept more work, determining whether the host systems are operating correctly and/or most efficiently, monitoring network security, and/or other management operations.

In the example of FIG. 11, the nodes 1102a-1102h are connected to one another using a switched architecture with point-to point links. The switched architecture includes multiple switches 1104a-1104d, which can be arranged in a multi-layered network such as a Clos network. A network device that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. The switches 1104a-1104d of FIG. 11 may be connected to the nodes 1102a-1102h and provide multiple paths between any two nodes.

The network 1100 may also include one or more network devices for connection with other networks 1108, such as a router 1106. Routers use headers and forwarding tables to determine the best path for forwarding the packets, and use protocols such as internet control message protocol (ICMP) to communicate with each other and configure the best route between any two devices. The router 1106 of FIG. 11 can be used to connect to other networks 1108 such as subnets, LANs, wide area networks (WANs), and/or the Internet.

In some examples, network 1100 may include any one or a combination of many different types of networks, such as cable networks, the Internet, wireless networks, cellular networks and other private and/or public networks. The interconnected switches 1104a-1104d and the router 1106, if present, may be referred to as a switch fabric 1110, a fabric, a network fabric, or simply a network. In the context of a computer network, terms "fabric" and "network" may be used interchangeably herein.

The nodes 1102a-1102h may be any combination of host systems, processor nodes, storage subsystems, and I/O chassis that represent user devices, service provider computers or third party computers.

User devices may include computing devices to access an application 1132 (e.g., a web browser or mobile device application). In some aspects, the application 1132 may be hosted, managed, and/or provided by a computing resources service or service provider. The application 1132 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 1108. Additionally, the user device(s) may be part of the distributed system managed by, controlled by, or otherwise part of the service provider computer(s) (e.g., a console device integrated with the service provider computers).

The node(s) of FIG. 11 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some examples, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 1132 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 1102a-1102h may include at least one memory 1118 and one or more processing units (or processor(s) 1120). The processor(s) 1120 may be implemented in hardware, computer-executable instructions, firmware, or combinations thereof. Computer-executable instruction or firmware implementations of the processor(s) 1120 may include computer-executable or machine-executable instructions written in any suitable programming language to perform the various functions described.

In some instances, the hardware processor(s) 1120 may be a single core processor or a multi-core processor. A multi-core processor may include multiple processing units within the same processor. In some examples, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 1118 may store program instructions that are loadable and executable on the processor(s) 1120, as well as data generated during the execution of these programs. Depending on the configuration and type of the node(s) 1102a-1102h, the memory 1118 may be volatile (such as RAM) and/or non-volatile (such as ROM, flash memory, etc.). The memory 1118 may include an operating system 1128, one or more data stores 1130, one or more application programs 1132, one or more drivers 1134, and/or services for implementing the features disclosed herein.

The operating system 1128 may support nodes 1102a-1102h basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, iOS, Android, and the like. The operating system 1128 may also be a proprietary operating system.

The data stores 1130 may include permanent or transitory data used and/or operated on by the operating system 1128, application programs 1132, or drivers 1134. Examples of such data include web pages, video data, audio data, images, user data, and so on. The information in the data stores 1130 may, in some implementations, be provided over the network(s) 1108 to user devices. In some cases, the data stores 1130 may additionally or alternatively include stored application programs and/or drivers. Alternatively or additionally, the data stores 1130 may store standard and/or proprietary software libraries, and/or standard and/or proprietary application user interface (API) libraries. Information stored in the data stores 1130 may be machine-readable object code, source code, interpreted code, or intermediate code.

The drivers 1134 include programs that may provide communication between components in a node. For example, some drivers 1134 may provide communication between the operating system 1128 and additional storage 1122, network device 1124, and/or I/O device 1126. Alternatively or additionally, some drivers 1134 may provide communication between application programs 1132 and the operating system 1128, and/or application programs 1132 and peripheral devices accessible to the service provider computer. In many cases, the drivers 1134 may include drivers that provide well-understood functionality (e.g., printer drivers, display drivers, hard disk drivers, Solid State Device drivers). In other cases, the drivers 1134 may provide proprietary or specialized functionality.

The service provider computer(s) or servers may also include additional storage 1122, which may include removable storage and/or non-removable storage. The additional storage 1122 may include magnetic storage, optical disks, solid state disks, flash memory, and/or tape storage. The additional storage 1122 may be housed in the same chassis as the node(s) 1102a-1102h or may be in an external enclosure. The memory 1118 and/or additional storage 1122 and their associated computer-readable media may provide non-volatile storage of computer-readable instructions, data structures, program modules, and other data for the computing devices. In some implementations, the memory 1118 may include multiple different types of memory, such as SRAM, DRAM, or ROM.

The memory 1118 and the additional storage 1122, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 1118 and the additional storage 1122 are examples of computer storage media. Additional types of computer storage media that may be present in the node(s) 1102a-1102h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 1102a-1102h. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 1102a-1102h may also include I/O device(s) 1126, such as a keyboard, a mouse, a pen, a voice input device, a touch input device, a display, speakers, a printer, and the like. The node(s) 1102a-1102h may also include one or more communication channels 1136. A communication channel 1136 may provide a medium over which the various components of the node(s) 1102a-1102h can communicate. The communication channel or channels 1136 may take the form of a bus, a ring, a switching fabric, or a network.

The node(s) 1102a-1102h may also contain network device(s) 1124 that allow the node(s) 1102a-1102h to communicate with a stored database, another computing device or server, user terminals and/or other devices on the network(s) 1100.

In some implementations, the network device 1124 is a peripheral device, such as a PCI-based device. In these implementations, the network device 1124 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the bus interface module may implement NVMe, and the network device 1124 may be connected to a computing system using a PCIe interface.

A PCI-based device may include one or more functions. A "function" describes operations that may be provided by the network device 1124. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 1124 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in the preceding figures, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Various examples of this disclosure are described herein, including the best mode known to the inventors for carrying out the disclosure. Variations of those examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A computer-implemented method for selecting numerical value based on a multinomial distribution, comprising:
   storing, in a first memory bank of an integrated circuit device, a first set of numerical values of the multinomial distribution;
   storing, in a second memory bank of the integrated circuit device, a second set of numerical values of the multinomial distribution;
   computing first cumulative sums on the first set of numerical values;
   computing second cumulative sums on the second set of numerical values;
   copying a first cumulative sum from the first memory bank to a third memory bank;
   copying a second cumulative sum from the second memory bank to the third memory bank;
   computing third cumulative sums on the first cumulative sum and the second cumulative sum;
   writing intermediate values to each of the first memory bank and the second memory bank, wherein a first intermediate value in the first memory bank is a zero value, and wherein a second intermediate value in the second memory bank is a third cumulative sum copied from the third memory bank;
   adding the first intermediate value to each of the first cumulative sums;
   adding the second intermediate value to each of the second cumulative sums;
   comparing a random number to each of the first cumulative sums and the second cumulative sums;
   writing, as a result of the comparing, a one value in place of a sum from the first cumulative sums or the second cumulative sums when the random number is greater than or equal to the sum, and a zero value otherwise;
   computing a first sum of a first set of one or zero values in the first memory bank;
   computing a second sum of a second set of one or zero values in the second memory bank;
   copying the first sum and the second sum to the third memory bank;
   computing a third sum using the first sum and the second sum, wherein the third sum is an index for the first set of numerical values or the second set of numerical values; and
   outputting the index.

2. The computer-implemented method of claim 1, further comprising:
   generating the first set of numerical values and the second set of numerical values using a computation for generating probabilities.

3. The computer-implemented method of claim 2, wherein the computation is a step in executing a neural network.

4. The computer-implemented method of claim 1, further comprising:

using the index in a computation in executing a neural network.

5. A computer-implemented method, comprising:
computing, using an integrated circuit device, first cumulative sums on numerical values stored in memory banks of the integrated circuit device, wherein sets of the numerical values are each stored in different memory banks, each memory bank having a bank identifier, and wherein each first cumulative sum is computed in parallel on a respective set of the numerical values in a respective memory bank;
computing second cumulative sums on a set of the first cumulative sums, the set of the first cumulative sums including a first cumulative sum from each of the memory banks;
adding to each first cumulative sum a second cumulative sum from the second cumulative sums, wherein the second cumulative sum that is added to each respective set of the first cumulative sums in a memory bank is from a memory bank with a bank identifier that is one less than a bank identifier for the memory bank storing the respective set of the first cumulative sums, and wherein the adding occurs in parallel on the respective set of the first cumulative sums in the respective memory bank;
comparing a random value against each of the first cumulative sums, wherein the comparing includes determining whether the random value is greater than or equal to each of the first cumulative sums;
storing results of the comparing in the memory banks, wherein sets of the results are each stored in different memory banks;
computing a first set of sums on the sets of the results, wherein the first set of sums includes a sum for each of the sets of the results, and wherein each of the first set of sums is computed in parallel on a respective set of the results in a respective memory bank;
computing a second sum on the first set of sums, wherein the second sum is an index of a particular numerical value of the numerical values; and
outputting the index.

6. The computer-implemented method of claim 5, wherein the numerical values each indicate a probability of being the particular numerical value.

7. The computer-implemented method of claim 5, wherein the random value is generated using a random number generator that produces evenly distributed random numbers.

8. The computer-implemented method of claim 5, wherein the numerical values are within a range having a minimum value and a maximum value, and wherein the random value is scaled to be greater than or equal to the minimum value and less than or equal to the maximum value.

9. The computer-implemented method of claim 5, wherein the integrated circuit device is configured such that data cannot be read from one memory bank and be written directly to another memory bank.

10. The computer-implemented method of claim 5, wherein data can be read from one memory bank and written to another memory bank indirectly using a register of the integrated circuit device.

11. The computer-implemented method of claim 5, further comprising:
copying, before computing the second cumulative sums, the set of the first cumulative sums from the memory banks to a separate memory bank.

12. The computer-implemented method of claim 5, further comprising:
copying, before performing the second sum, the first set of sums in the memory banks to a separate memory bank.

13. The computer-implemented method of claim 5, further comprising:
performing a computation using the index.

14. The computer-implemented method of claim 5, further comprising:
performing a computation that produces the numerical values.

15. An integrated circuit device, comprising:
an array of memory banks;
an execution engine including execution units, each execution unit being an instance of a same integrated circuit, wherein a memory bank is assigned to each execution unit; and
a memory storing instructions that cause the execution engine to configure the execution units to perform operations including:
computing first cumulative sums on numerical values stored in memory banks of the integrated circuit device, wherein sets of the numerical values are each stored in different memory banks, each memory bank having a bank identifier, and wherein the execution units compute the first cumulative sums in parallel on respective sets of the numerical values in respective memory banks;
computing second cumulative sums on a set of the first cumulative sums, the set of the first cumulative sums including a first cumulative sum from each of the memory banks;
adding, to each first cumulative sum a second cumulative sum from the second cumulative sums, wherein the second cumulative sum that is added to each respective set of the first cumulative sums in a memory bank is from a memory bank with a bank identifier that is one less than a bank identifier for the memory bank storing the respective set of the first cumulative sums, and wherein the execution units performing the adding occurs parallel on respective sets of the first cumulative sums in the respective memory banks;
comparing a random value against each of the first cumulative sums, wherein the comparing includes determining whether the random value is greater than or equal to each of the first cumulative sums;
storing results of the comparing in the memory banks, wherein sets of the results are each stored in different memory banks;
computing a first set of sums on the sets of the results, wherein the first set of sums includes a sum for each of the sets of the results, and wherein the execution units compute the first set of sums in parallel on the respective set of the results in respective memory banks;
computing a second sum on the first set of sums, wherein the second sum is an index of a particular numerical value of the numerical values; and
outputting the index.

16. The integrated circuit device of claim 15, wherein the execution units are operable to perform a same operation on different data stored in the memory banks assigned to each of the execution units.

17. The integrated circuit device of claim 15, wherein an execution unit is only able to read from or write to a memory bank assigned to the execution unit.

18. The integrated circuit device of claim 15, further comprising:
   a set of registers each operable to load a value from any of the memory banks and operable to store a value to any of the memory banks.

19. The integrated circuit device of claim 15, further comprising:
   a random number generator circuit operable to generate evenly distributed random values.

20. The integrated circuit device of claim 15, wherein the integrated circuit device is part of a neural network accelerator.

* * * * *